(12) United States Patent
Roth et al.

(10) Patent No.: US 9,521,140 B2
(45) Date of Patent: *Dec. 13, 2016

(54) SECURE EXECUTION ENVIRONMENT SERVICES

(71) Applicant: Amazon Technologies, Inc., Seattle, WA (US)

(72) Inventors: Gregory Branchek Roth, Seattle, WA (US); Aaron Douglas Dokey, Seattle, WA (US); Eric Jason Brandwine, Haymarket, VA (US); Nathan Bartholomew Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/001,175

(22) Filed: Jan. 19, 2016

(65) Prior Publication Data

US 2016/0134623 A1  May 12, 2016

Related U.S. Application Data

(63) Continuation of application No. 14/476,569, filed on Sep. 3, 2014, now Pat. No. 9,246,690.

(51) Int. Cl.
*H04L 29/06* (2006.01)
*H04L 9/32* (2006.01)
(Continued)

(52) U.S. Cl.
CPC .......... *H04L 63/0823* (2013.01); *G06F 21/53* (2013.01); *G06F 21/56* (2013.01); *G06F 21/575* (2013.01);
(Continued)

(58) Field of Classification Search
CPC .... H04L 63/064; H04L 63/0853; G06F 21/72; G06F 21/53; G06F 21/60
See application file for complete search history.

(56) References Cited

U.S. PATENT DOCUMENTS 4,218,582 A   8/1980   Hellman et al.
4,405,829 A   9/1983   Rivest et al.
(Continued)

FOREIGN PATENT DOCUMENTS

WO   WO2008118648   10/2008

OTHER PUBLICATIONS

Hoekstra, M., "Intel® SGX for Dummies (Intel® SGX Design Objectives)," <https://softwareintel.com/en-us/blogs/2013/09/26/protecting-application-secrets-with-intel-s . . . > [retrieved Sep. 3, 2014], 4 pages.
(Continued)

*Primary Examiner* — Amir Mehrmanesh
(74) *Attorney, Agent, or Firm* — Davis Wright Tremaine LLP

(57) ABSTRACT

Techniques for managing secure execution environments provided as a service to computing resource service provider customers are described herein. A request to launch a secure execution environment is received from a customer and fulfilled by launching a secure execution environment on a selected computer system. The secure execution environment is then validated and upon a successful validation, one or more applications are provided to the secure execution environment to be executed within the secure execution environment. As additional requests relating to managing the secure execution environment are received, operations are performed based on the requests.

20 Claims, 14 Drawing Sheets

(51) Int. Cl.
*G06F 21/56* (2013.01)
*G06F 21/53* (2013.01)
*G06F 21/57* (2013.01)

(52) U.S. Cl.
CPC ........... *H04L 9/3268* (2013.01); *H04L 63/062* (2013.01); *H04L 63/123* (2013.01)

(56) References Cited

U.S. PATENT DOCUMENTS

| | | | |
|---|---|---|---|
| 5,643,085 A | 7/1997 | Aityan et al. |
| 5,643,086 A | 7/1997 | Alcorn et al. |
| 5,666,533 A | 9/1997 | Horiguchi et al. |
| 5,848,159 A | 12/1998 | Collins |
| 5,867,578 A | 2/1999 | Brickell et al. |
| 5,905,799 A | 5/1999 | Ganesan |
| 6,071,190 A | 6/2000 | Weiss et al. |
| 6,237,097 B1 | 5/2001 | Frankel et al. |
| 6,364,796 B1 | 4/2002 | Nakamura et al. |
| 6,631,354 B1 | 10/2003 | Leymann et al. |
| 6,722,986 B1 | 4/2004 | Lyons et al. |
| 7,063,615 B2 | 6/2006 | Alcorn et al. |
| 7,917,747 B2 | 3/2011 | Wolf |
| 8,291,468 B1 | 10/2012 | Chickering |
| 8,407,584 B1 | 3/2013 | Broodman et al. |
| 8,473,754 B2 | 6/2013 | Jones et al. |
| 9,116,733 B2 | 8/2015 | Banga |
| 9,154,479 B1 | 10/2015 | Sethi |
| 9,246,690 B1 | 1/2016 | Roth et al. |
| 2002/0184046 A1 | 12/2002 | Kamada et al. |
| 2004/0176068 A1 | 9/2004 | Paatero |
| 2005/0091535 A1 | 4/2005 | Kavalam et al. |
| 2005/0278418 A1 | 12/2005 | Rathakrishnan et al. |
| 2006/0161887 A1 | 7/2006 | Krishnaswamy et al. |
| 2007/0050763 A1 | 3/2007 | Kagan et al. |
| 2007/0153715 A1 | 7/2007 | Covington et al. |
| 2007/0206799 A1 | 9/2007 | Wingert et al. |
| 2008/0216071 A1 | 9/2008 | Gidalov |
| 2009/0112359 A1 | 4/2009 | Sanguinetti |
| 2009/0313406 A1 | 12/2009 | Suh et al. |
| 2010/0031325 A1 | 2/2010 | Maigne et al. |
| 2010/0077473 A1 | 3/2010 | Ohta et al. |
| 2012/0084838 A1 | 4/2012 | Inforzato et al. |
| 2012/0144457 A1 | 6/2012 | Counterman |
| 2012/0159184 A1 | 6/2012 | Johnson |
| 2012/0192177 A1 | 7/2012 | Tsirkin |
| 2013/0007239 A1 | 1/2013 | Agarwal et al. |
| 2013/0117561 A1 | 5/2013 | Chawla et al. |
| 2013/0151846 A1 | 6/2013 | Baumann et al. |
| 2013/0174150 A1 | 7/2013 | Nakajima |
| 2013/0174151 A1 | 7/2013 | Nakajima |
| 2013/0179682 A1 | 7/2013 | Ramachandran et al. |
| 2013/0198853 A1 | 8/2013 | McKeen |
| 2013/0227286 A1 | 8/2013 | Brisson |
| 2013/0246778 A1 | 9/2013 | Nikara et al. |
| 2013/0282776 A1 | 10/2013 | Durrant et al. |
| 2013/0312117 A1 | 11/2013 | Sapp, II et al. |
| 2013/0318343 A1 | 11/2013 | Bjarnason et al. |
| 2013/0326504 A1 | 12/2013 | Tsirkin et al. |
| 2014/0075496 A1 | 3/2014 | Prakash et al. |
| 2014/0105393 A1 | 4/2014 | Kolesnikov |
| 2014/0181359 A1 | 6/2014 | Zhang et al. |
| 2014/0201841 A1 | 7/2014 | Deshpande et al. |
| 2014/0223543 A1 | 8/2014 | Jeansonne et al. |
| 2014/0282935 A1 | 9/2014 | Lal et al. |
| 2014/0283098 A1 | 9/2014 | Phegade et al. |
| 2014/0317686 A1 | 10/2014 | Vetillard |
| 2014/0325515 A1 | 10/2014 | Salmela et al. |
| 2014/0331317 A1 | 11/2014 | Singh |
| 2014/0351583 A1 | 11/2014 | Bettale et al. |
| 2014/0373012 A1 | 12/2014 | Ylitalo et al. |
| 2015/0007175 A1 | 1/2015 | Potlapally et al. |
| 2015/0058629 A1 | 2/2015 | Yarvis et al. |
| 2015/0127834 A1 | 5/2015 | Udupi et al. |
| 2015/0143347 A1 | 5/2015 | Jones et al. |
| 2015/0143374 A1 | 5/2015 | Banga et al. |
| 2015/0143375 A1 | 5/2015 | Bruso et al. |
| 2015/0199509 A1 | 7/2015 | Wille |
| 2015/0200948 A1 | 7/2015 | Cairns et al. |
| 2015/0244716 A1 | 8/2015 | Potlapally |
| 2015/0254451 A1 | 9/2015 | Doane et al. |
| 2015/0278528 A1 | 10/2015 | Xing et al. |
| 2016/0088009 A1 | 3/2016 | Gupta et al. |

OTHER PUBLICATIONS

Hoekstra, M., "Intel® SGX for Dummies —Part 2," <https://software.intel.com/en-us/blogs/2014/06/02/intel-sgw-for-dummies-part-2> [retrieved Sep. 3, 2014], 3 pages.

Hoekstra, M., "Intel® SGX for Dummies —Part 3," <https://software.intel.com/en-us/blogs/2014/09/01/intel-sgw-for-dummies-part-3> [retrieved Sep. 3, 2014], 3 pages.

"Intel® Software Guard Extension Programming Reference," Intel®, Reference No. 329298-001US, Sep. 2013, 156 pages.

McKeen, F., et al., "Innovative Instructions and Software Model for Isolated Execution," Proceedings of the 2nd International Workshop on Hardware and Architectural Support for Security and Privacy, Jun. 23-24, 2013, Tel-Aviv, Israel, pp. 1-8.

Goldreich et al., "How to Play Any Mental Game," In Proceedings of the Nineteenth Annual ACM Symposium on Theory of Computing (STOC '87), Alfred V. Aho (Ed.). ACM, New York, NY, USA, pp. 218-229, 1987.

SECURE EXECUTION ENVIRONMENT SERVICES

CROSS-REFERENCE TO RELATED APPLICATIONS

This application is a continuation of U.S. patent application Ser. No. 14/476,569, filed Sep. 3, 2014, entitled "SECURE EXECUTION ENVIRONMENT SERVICES," the content of which is incorporated by reference herein in its entirely.

BACKGROUND

Modern computer systems place a high importance on maintaining data and application security. In a modern distributed and/or virtual computer system environment, where a plurality of users, services, applications, virtual machines, controlling domains and hosts have access to a computer system, maintaining data and application security may be a difficult problem. In a distributed and/or virtual computer system environment, for example, where the computer system resources may be provided by a computing resource service provider, customers may also wish for additional security for sensitive or restricted data, protecting such data even from the computing resource service provider.

Encrypting data or applications may help ameliorate the security concerns, but users often desire additional assurances. For example, users may desire additional assurances that malicious applications are unable to temporarily obtain trusted status on a host machine, thereby gaining access to the encryption keys and thus compromising the encryption security. Similarly, a controlling domain or operating system on a virtual machine may always have trusted status and thus can read or write directly from computer system memory freely. Accordingly, users may desire assurances of the security of data and applications operating within a computing resource service provider, even against potential discovery by the computing resource service provider.

BRIEF DESCRIPTION OF THE DRAWINGS

Various embodiments in accordance with the present disclosure will be described with reference to the drawings, in which.

DETAILED DESCRIPTION

Figure 1:
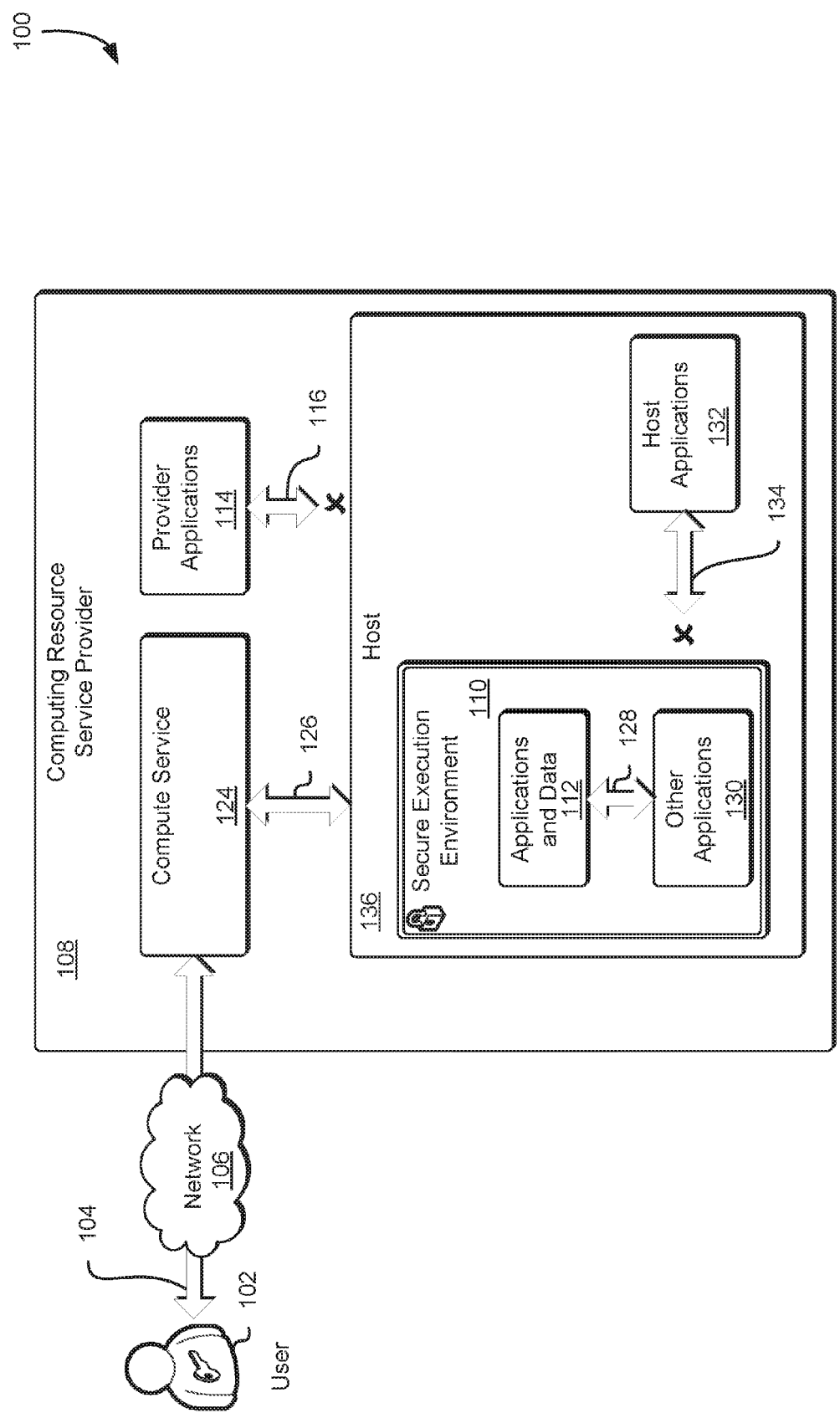
FIG. 1 illustrates an example environment where users may connect to a secure execution environment service to instantiate a secure execution environment in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, processes, and methods for providing secure execution environments (such as enclaves, discussed below) as a service. A computing resource service provider provides compute capacity as a service such that the compute capacity is remotely and programmatically managed by customers of the computing resource service provider. The service allows customers to configure and control access to a secured execution environment hosted by the service provider. Customers may execute applications within secure execution environments provided by the service provider. Such secure execution environments may be configured to provide one or more services to authorized users, processes, applications and/or modules.

A secure execution environment may be instantiated within a computer system provided by a computing resource service provider and applications or data may be installed within that secure execution environment. The secure execution environment may be instantiated by accessing a compute service operated by the computing resource service provider. The computing resource service provider may provide access to the compute service by exposing, for example, a web interface configured to receive secure execution environment instantiation requests. In response to a request to instantiate a secure execution environment, the compute service may locate a suitable host computer system upon which to instantiate the secure execution environment. When a suitable host environment is located, a secure execution environment may be instantiated by the compute service on the computer system. A secure execution environment may be instantiated on a computer system by sending a request (referred to herein as a "provisioning request") to the selected computer system (also referred to herein as the "target computer system") specifying how the secure execution environment may be configured and/or how and where it may be instantiated.

A secure execution environment may be configured to permit applications internal to the secure execution environment to access the contents of the secure execution environment and to prevent applications external to the secure execution environment from accessing the contents of the secure execution environment. For example, a secure execution environment may be configured such that, even privileged applications of a virtualization platform may not access the secure execution environment contents. The secure execution environment may be configured to prevent access to unencrypted secure execution environment data (i.e., data resident within the secure execution environment) by any applications external to the secure execution environment by automatically encrypting any data stored within the secure execution environment. Additionally, any data that exits the secure execution environment may be cleansed of any metadata that may refer to the memory addresses within the secure execution environment, thus preventing external software from determining the location of secure execution environment-protected data in computer system memory.

In some embodiments, customers are able to verify that a secure execution environment remains in a valid state and that, for example, unauthorized code has not been introduced into the secure execution environment. The service provider may, through the web interface, provide access to a secure execution environment's ability to provide remote attestation as to the state of the secure execution environment. For example, the secure execution environment may have a set of functions that, when executed by a processor, provide a cryptographically verifiable measurement indicating the current state of executable code and/or data within the secure execution environment. The cryptographically verifiable measurement may be rooted in a root of trust separate and protected from outside entities. That is, the secure execution environment may have cryptographic keys resident within the secure execution environment for digitally signing data output from the secure execution environment, and, by verifying the digital signature, applications external to the secure execution environment may be configured to trust the output data. In this manner, customers can verify the security of data and code in the secure execution environment.

When a secure execution environment is created by the provider for the customer, the customer may receive an access key which may control access to the secure execution environment but which may not, in some embodiments, allow examination of the contents of the secure execution environment. Data may be installed in the secure execution environment and applications may be instantiated to run within the secure execution environment. Entities outside of the secure execution environment may not access data stored in the secure execution environment, data sent to the applications, the execution of the applications, the output of the applications or any other data and/or applications within the secure execution environment, while such data and/or applications remain within the secure execution environment. Data and/or results of applications may be accessed only if they are sent out from the secure execution environment and may be encrypted and/or cleansed of any identifying information prior to being sent out using one or more encryption keys. The encryption keys (and any corresponding decryption keys) may be made available to a user or process with proper credentials associated with the secure execution environment.

Secure execution environment functionality available to customers of the service provider may include functionality to create secure execution environments, destroy secure execution environments, measure (gather metrics from) secure execution environments, populate secure execution environments, generate keys, send data, receive data and/or other functionality. Secure execution environment functionality may also include functionality to monitor resources within a secure execution environment using, for example, a resource monitor configured to monitor resource usage and generate requests for additional resources to be provided to the secure execution environment based on changes in resource demands. Access to such secure execution environment functionality may be provided by a library, interface, webservice, application programming interface ("API") or other access methodology. For example, access to secure execution environment functionality may be provided by an application programming interface request (also referred to herein as an "API request") configured to make API calls to request such access. With access to the interface, a computing resource service provider may provide that access to a user of a computer system as a service as described herein. As may be contemplated, the providers of secure execution environment functionality, the types of secure execution environment functionality and the methods of providing access to secure execution environment functionality described herein are merely illustrative examples and, as such, other providers of secure execution environment functionality, types of secure execution environment functionality and methods of providing access to secure execution environment functionality may be considered as within the scope of the present disclosure.

In an illustrative example, a host computer system may provide secure execution environment functionality via the Intel® Software Guard Extensions (referred to herein as "Intel® SGX" or more simply as "SGX") that may be enabled on the central processing unit ("CPU") of the host computer system, although the scope of the present disclosure extends to other secure execution environment types. A controlling domain may be running on that host computer system and may manage one or more virtual machine ("VM") instances also running on that host computer system. An application or process running on the host computer system (e.g., the host operating system, a service running under the control of the host operating system, the controlling domain, a service running under control of the controlling domain, a guest operating system running on a virtual machine instance ("VM instance"), a service running on a VM instance or a combination of these) may provide an interface to the secure execution environment functionality. A user, client, service, module, or other entity with access to a VM instance on the host computer system may use that interface to the secure execution environment functionality to perform secure execution environment operations.

FIG. 1 illustrates an example environment 100 where users may connect to a service such as a compute service running within a computing resource service provider environment to request access to a secure execution environment within a computing resource service provider environment in accordance with an embodiment. A user 102 may send a request 104 (e.g., a web service request to an API exposed by the computing resource service provider) over a network 106 to a compute service 124 running within a computer system environment provided by a computing resource service provider 108. The request 104 may be authenticated (e.g., by being transmitted with a digital signature of the request). The user 102 may be a person, or may be a process running on one or more remote computer systems, or may be a computer system client or may be another computer system entity. A user 102 may request that the compute service 124 instantiate (i.e., cause to be instantiated) a secure execution environment. As a result of the request, the compute service 124 may send a provisioning request to a host 136 to instantiate the secure execution environment. After the secure execution environment is instantiated, the user 102 may use the secure execution environment to store data items (also referred to herein as "data") and/or to execute applications. The host 136 may be chosen based at least in part on the ability to support the secure execution environment. A user 102 that creates a secure execution environment may receive an access key as described herein.

The provisioning request may include a specification for capabilities (e.g., hardware capabilities) that may indicate parameters for a suitable host environment for instantiating a secure execution environment. The suitable host environment may be located based on host availability, level of security desired, and/or other factors. For example, a provisioning request may specify a minimum level of security (also referred to herein as a "level of security indicator") required in order to instantiate the secure execution environment. A level of security indicator is an indication of the level of security of a host environment that may be provided by a particular computer system, based on the hardware, software, and/or firmware that may be made available to that computer system. For example, a computer system with one or more processors that implement the Intel® SGX instruction set may be more secure (i.e., have a higher level of security indicator) than a computer system that has a processor that is configured to operate as a trusted platform module ("TPM"). One or both of these computer systems that have such capabilities implemented in hardware may have a higher level of security indicator than a computer system that implements such capabilities in software (e.g., a using a virtual TPM and/or a virtual CPU that implements the Intel® SGX instruction set.

A provisioning request may also include data and/or metadata associated with the configuration of a secure execution environment and/or with placement constraints on associated computer system resources. A provisioning request may be issued as a request (e.g., web service request) to a service, such as a compute service an API call, a library call, or a combination of these and/or other request types and such requests may include the placement constraints. The placement of any computer system resources associated with the provisioning request may be performed by a placement service of the computing resource service provider, which may use one or more the placement constraints to make placement decisions. For example, placement of computer system resources such as secure execution environment may be made based at least in part on proximity between a candidate location and one or more other resources associated with the requester of the secure execution environment. A customer may request the placement of a secure execution environment in close proximity to storage devices or other computer systems that are controlled by and/or frequently used by the customer. The customer may also request the placement of a secure execution environment that is in far proximity from other resources to, for example, maximize redundancy of the computer system. Proximity between pairs of computer system resources may be defined by physical distance, by network bandwidth availability, by network latency, by the number of network hops or by some other proximity measurement. Other hardware configuration criteria including CPU type, CPU capabilities, amount of memory, storage availability, hardware availability, hardware cost, system redundancy, network availability, client locations, or other such factors may be included in computer system resource placement decisions.

The secure execution environment 110, in an embodiment, provides functionality to securely store sensitive data or applications by providing a hardware-secured region within a host 136 where data may be stored and applications may be executed, but such data and applications may not be accessible outside of the secure execution environment. Hardware within the host 136 ensures that data stored within a secure execution environment and applications running within a secure execution environment are not accessible to any entity outside of the secure execution environment. Data may be protected from outside access by using one or more encryption techniques such as key pairs, certificates, or other such encryption techniques. Such encrypted data items may be protected from unauthorized access by generating encryption information (i.e., cryptographic keys) and/or storing decryption information within the secure execution environment. In some embodiments, the secure execution environment 110 may be configured using dedicated hardware which may implement a variety of security assurance methods such as microcode instructions on a central processing unit, a trusted platform module, or other security assurance methods.

Trusted users and services such as applications 130 running within the secure execution environment 110 may access the secure execution environment in order to use secure execution environment functionality. A user, client, service, process, application, module, or other such entity with access to a service and/or access to the resources served by that service may use that secure execution environment functionality to further secure data and/or applications associated with that service. Trusted users and services may have the ability to create secure execution environments, populate secure execution environments with data and/or applications, obtain keys for decrypting results from secure execution environments, measure secure execution environments, start applications within secure execution environments retrieve data from secure execution environments and utilize other secure execution environment functionality.

Provider applications 114 may also be restricted from accessing 116 the secure execution environment 110 and/or the applications and data 112 stored therein if such provider applications 114 are not trusted by the secure execution environment. Provider applications 114 are applications operating under the control of the computing resource service provider 108. Provider applications 114 may be restricted from accessing 116 the secure execution environment 110 and/or the applications and data 112 stored within the secure execution environment 110. Provider applications 114 which may be restricted from accessing 116 the secure execution environment 110 and/or the applications and data 112 stored within the secure execution environment 110 may be operating on the same host machine as the secure execution environment 110 and/or the applications and data 112 or may be operating on a different host machine than the host machine where the secure execution environment 110 and/or the applications and data 112 are operating. In some embodiments, provider applications 114 may have permission to perform a subset of activities or commands in connection with the secure execution environment 110 in accordance with one or more system policies. In some embodiments, provider applications 114 may be restricted from all access to the secure execution environment 110 and may also be restricted from all access to the applications and data 112 stored within the secure execution environment 110.

Host applications 132 may also be restricted from accessing 134 the secure execution environment 110 and/or the applications and data 112 stored therein if such host applications 132 are not trusted by the secure execution environment. Host applications 132 are applications operating on the host which may be under the control of the computing resource service provider 108 or may be under the control of some other entity (such as the user 102). Host applications 132 which may be restricted from accessing 134 the secure execution environment 110 and/or the applications and data 112 stored within the secure execution environment 110 may be operating on the same host machine as the secure execution environment 110 and/or the applications and data 112 or may be operating on a different host machine than the host machine where the secure execution environment 110 and/or the applications and data 112 are operating. In some embodiments, host applications 132 may have permission to perform a subset of activities or commands in connection with the secure execution environment 110 in accordance with one or more system policies. In some embodiments, host applications 132 may be restricted from all access to the secure execution environment 110 and may also be restricted from all access to the applications and data 112 stored within the secure execution environment 110.

The host 136 may provide secure execution environment functionality to other applications operating within the host computer system, via instructions enabled on the CPU of the host computer system. Secure execution environment functionality may be provided to the host 136 by a specialized instruction set such as Intel® SGX extensions, by a module such as a TPM, system microcode or by combinations of these and/or other provisions. A secure execution environment provided by a service such as a compute service may be provided on a selected computer system which supports such specialized instruction sets. In some embodiments, a secure execution environment may be provided as a service by selecting the host 136 from a plurality of candidate systems which may be configured to support secure execution environment functionality. In such embodiments, the host 136 may be selected from a plurality of computer systems which may provide the hardware capabilities and/or the level of security indicator required for the secure execution environment. The host 136 may also be selected using secondary selection criteria associated with the computer system, including resource availability, proximity to users and/or other secondary selection criteria. Data and/or metadata associated with the hardware capabilities of a computer system may be stored by the resource provider as a hardware description of the computer system, and may be stored in a data storage location such as a hardware capabilities database or hardware capabilities file.

The secure execution environment functionality may be provided to applications 130 running within the secure execution environment 110 on the host 136. For example, a virtual computer system service running on the host may access the secure execution environment functionality to provide that functionality to VM instances running under control of a virtual computer system service. Similarly, other services may include block-level data storage services, cryptography services, on-demand data storage services, notification services, authentication services, policy management services, task services and/or other services may also access the secure execution environment functionality to provide that functionality resources associated with those services. In some embodiments, secure execution environment functionality may also be provided to one or more customers of the computing resource service provider. A user with access to a service and/or access to the resources served by that service may use that secure execution environment functionality to further secure data and/or applications associated with that service. In an illustrative example, a virtual computer system service as described herein and/or a VM instance associated with that virtual computer system service may use the secure execution environment functionality to create a secure execution environment, populate that secure execution environment with data and/or applications, obtain keys for decrypting results from the secure execution environment, start the applications within the secure execution environment and receive updates.

Secure execution environment functionality may be provided to one or more other services within the computing resource service provider and/or to one or more customers of the computing service resource provider using a variety of techniques. For example, as described herein, in response to a request to create a secure execution environment from a customer, a secure execution environment may be created and may be initially populated with executable code which may be configured as an agent to provide access to secure execution environment functionality. The agent may be an application, module, process and/or the like which may be configured to instantiate other applications within the secure execution environment, may be configured to provide security keys from the host computer CPU, may be configured to locate other resources within the computer system or may be configured to perform with other functionality. The agent (also referred to herein as a "bootloader") is described in more detail in connection with FIG. 4.

Figure 2:
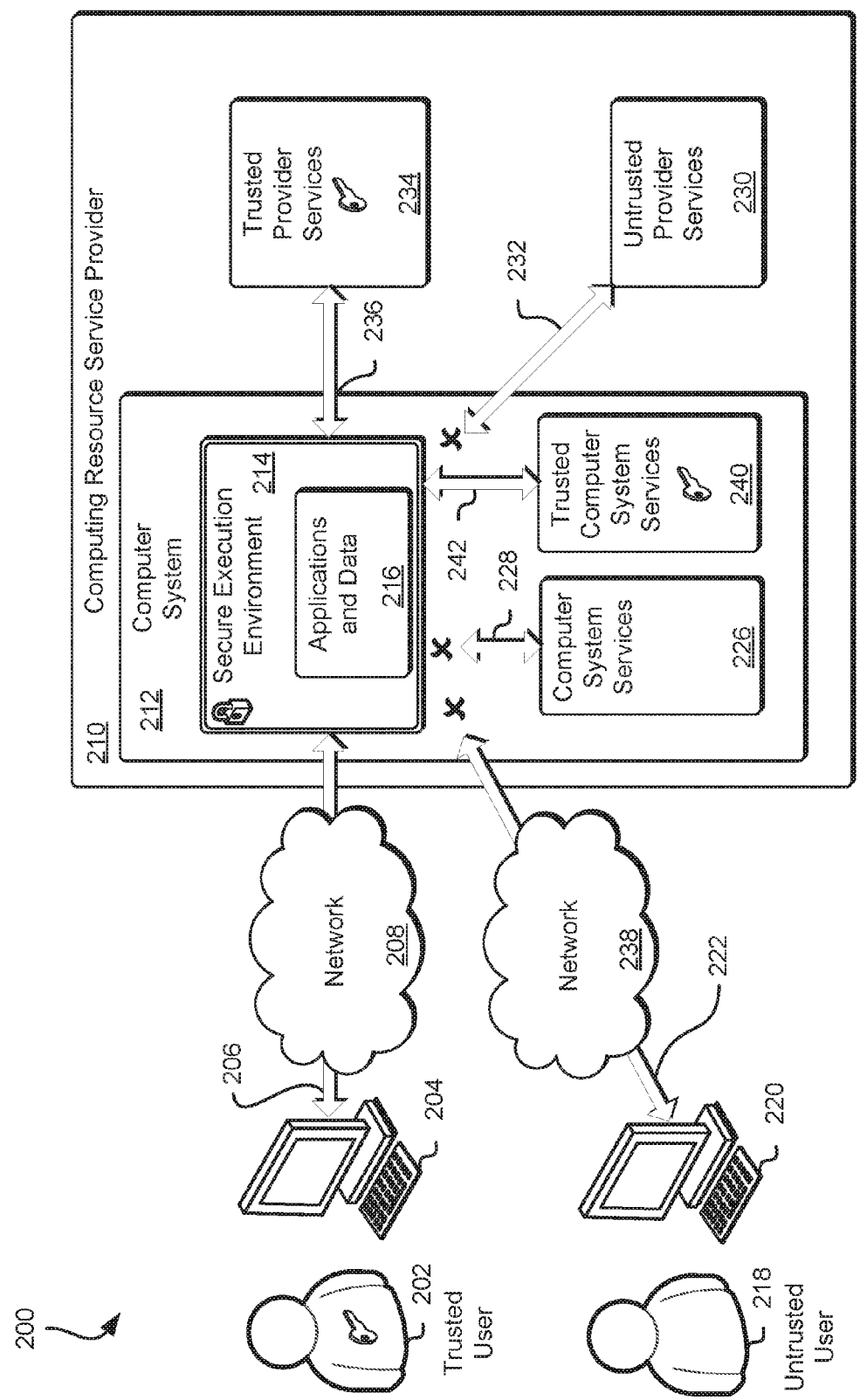
FIG. 2 illustrates an example environment where trusted users and services may access a secure execution environment in accordance with an embodiment.

FIG. 2 illustrates an example environment 200 where trusted users and trusted services may access a secure execution environment operating within a computing resource service provider as described herein in connection with FIG. 1 and in accordance with an embodiment. As used herein with respect to trusted users and trusted services, the terms "trusted" may be understood to refer to a degree of isolation between users and the secure execution environment or between services and the secure execution environment. A trusted user or service may have access to functionality associated with a secure execution environment such as, for example, an authorization to send data to and/or to receive data from a secure execution environment, to instantiate applications within a secure execution environment and/or some another secure execution environment. An untrusted user or service may not have such access to functionality associated with the secure execution environment may be considered to be isolated from the secure execution environment. For example, a trusted user or service may receive and decrypt encrypted data from a secure execution environment via a mechanism such as an access key, certificate, or other such access mechanism provided by the secure execution environment. An untrusted user or service may not be able to decrypt such encrypted data, thereby keeping such data isolated from the untrusted user or service. Applications running within a secure execution environment such as the applications 130 described herein in connection with FIG. 1 may be considered trusted applications while the provider applications 114 and the host applications 132 (both as described herein in connection with FIG. 1) which may be isolated from the secure execution environment may be considered untrusted applications.

Entities may also be considered untrusted or trusted with respect to one another. For example, a first secure execution environment that is not isolated from a second secure execution environment may be considered as trusted with respect to that second secure execution environment. Similarly, a first service which may be isolated from a second service may be considered as untrusted with respect to that second service. Other computer system entities may also be considered trusted or untrusted with respect to each other.

A trusted user 202 may access functionality associated with a secure execution environment 214 operating on a computer system 212 as described herein. A user may be or may become a trusted user 202 by virtue of having possession of an access key associated with a secure execution environment as described herein. The access key may be provided to the trusted user 202 at the time that a secure execution environment is created, or as a result of having that key provided to the user or by some other mechanism. The trusted user 202 may access functionality associated with the secure execution environment 214 using a connection 206 using a computer system client device 204. The computer system 212 may be operating within a computing resource service provider 210. The computing resource service provider 210 may provide a distributed, virtualized and/or datacenter environment within which one or more applications, processes, services, virtual machines and/or other computer system entities may be executed. The trusted user 202 may be a person, or may be a process running on one or more remote computer systems, or may be some other computer system entity, user, or process.

The command or commands to initiate the connection 206 to the computer system 212 may originate from an outside computer system, or may originate from an entity, user or process in a remote network location, or may originate from an entity, user or process within the computing resource service provider, or may originate from a user of the computer system client device 204, or may originate as a result of an automatic process or may originate as a result of a combination of these and/or other origin entities. In some embodiments, one or more commands may be used to first initiate a connection to the computing resource service provider. The command or commands to initiate the connection 206 to the computing resource service provider 210 may be sent to the computing resource service provider 210, without the intervention of the trusted user 202. The command or commands to initiate the connection 206 to the computer system 212 may originate from the same origin as the command or commands to connect to the computing resource service provider 210 or may originate from another computer system and/or server, or may originate from a different entity, user or process on the same or a different remote network location, or may originate from a different entity, user or process within the computing resource service provider, or may originate from a different user of a computer system client device 204, or may originate as a result of a combination of these and/or other same and/or different entities.

The trusted user 202 may request connection to the computing resource service provider 210 via a connection 206 and, in some embodiments, via a network 208 and/or via entities associated therewith, such as servers connected to the network, either directly or indirectly. The computer system client device 204 that may request access to the computer system 212 may include any device that is capable of connecting with a computer system via a network, including those discussed below. The network 208 may be a network or combination of networks from network types discussed below.

The computing resource service provider 210 may provide access to one or more host machines as well as provide access to computer services such as virtual machine (VM) instances, automatic scaling groups, file-based database storage systems, block storage services, redundant data storage services, data archive services, data warehousing services, user access management services, content management services, and/or other computer system services as may be running thereon. The computing resource service provider 210 may also provide access to computer system resources such as user resources, policy resources, network resources, and/or storage resources. In some distributed and/or virtualized computer system environments, the resources associated with the computer services may be physical devices, virtual devices, combinations of physical, and/or virtual devices or other device embodiments. In some embodiments, the host machines may be physical machines located within the computer system environment. In some embodiments, the host machines may be guest virtual machines operating on physical machines located within the computer system environment.

A secure execution environment 214 may be operating within the computer system 212. The secure execution environment 214 may contain and/or otherwise administer access to one or more secure execution environments and may also contain and/or otherwise administer applications and data 216 stored within the secure execution environment 214. As described herein, the secure execution environment 214 may be configured to provide access to the secure execution environment functionality by trusted users and/or services so that, for example, those trusted users and/or services may access and use the functionality associated with the secure execution environment 214 as described herein. A user, client, service, process, application, module, or other entity with access to a service and/or access to the resources served by that service may use that secure execution environment functionality to further secure data and/or applications associated with that service. Trusted users and/or services may use the secure execution environment functionality to create secure execution environments, populate secure execution environments with data and/or applications, obtain keys for decrypting results from secure execution environments, measure secure execution environments, start applications within secure execution environments retrieve data from secure execution environments and other such secure execution environment functionality. The trusted user 202 may connect to the secure execution environment 214 via the connection 206 or via an additional connection such as a dedicated connection established to connect to the secure execution environment 214. The additional connection may share one or more characteristics in common with the connection 206 as described herein. In some embodiments, the connection to the secure execution environment may fail due to a failure of the secure execution environment and/or due to a failure to validate the secure execution environment. Such failures may occur silently or may result in failure indications being sent to the service provider and/or to one or more clients of the secure execution environment.

One or more trusted provider services 234 operating within the computing resource service provider environment may access functionality associated with the secure execution environment 214 using one or more connections 236. Trusted provider services may be operating on computer systems within the computing resource service provider 210 environment. A provider service may become one of the trusted provider services 234 by virtue of having possession of an access key associated with a secure execution environment 214 as described herein. Access keys may be provided to the trusted provider services 234 at the time that a secure execution environment is created, or as a result of having that key provided to the provider service or by another mechanism. For example, a provider service configured to provide database services may be configured to receive and store encrypted data from a secure execution environment 214. Such a database service may become a trusted provider service and may be provided with the access key so that the database service can receive encrypted data from the secure execution environment.

In some embodiments, an untrusted user 218 may connect to the computer system 212 and/or to another service operating within the computing resource service provider 210 using a connection 222 and may connect to the computer system 212 and/or to another resource within the computing resource service provider 210 using a computer system client device 220. The untrusted user 218 may be a person, or may be a process running on one or more remote computer systems, or may be some other computer system entity, user, or process. A user may be an untrusted user 218 by virtue of not having possession of an access key associated with a secure execution environment 214. The command or commands to initiate the connection 222 to the computer system 212 and/or to some other resource within the computing resource service provider 210 may originate from an outside computer system and/or server, or may originate from an entity, user or process in a remote network location, or may originate from an entity, user or process within the computing resource service provider 210, or may originate from a user of the computer system client device 220, or may originate as a result of an automatic process or may originate as a result of a combination of these and/or other origin entities.

The command or commands to initiate the connection 222 to the computer system 212 and/or to some other resource within the computing resource service provider 210 may be sent to the computer system 212, without the intervention of the untrusted user 218. The command or commands to initiate the connection 222 to the computer system 212 may originate from the same origin as the command or commands to connect to the computing resource service provider 210 or may originate from another computer system and/or server, or may originate from a different entity, user or process on the same or a different remote network location, or may originate from a different entity, user or process within the computing resource service provider, or may originate from a different user of a computer system client device 220, or may originate as a result of a combination of these and/or other such same and/or different entities.

The untrusted user 218 may connect to resources within the computing resource service provider 210 via a network 238 and/or via entities associated therewith, such as servers connected to the network, either directly or indirectly. The computer system client device 220 that may request access to the computer system 212 may include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines and/or other types of computing devices and/or components. As with the network 208 described herein, the network 238 may include a variety of network types. In some embodiments, the network 208 may be the same as the network 238.

An untrusted user 218 may attempt to access functionality associated with the secure execution environment 214 using the connection 222 using the network 238 and may also attempt to access the applications and data 216 stored within the secure execution environment 214. As indicated in the example illustrated in FIG. 2, the attempt by the untrusted user 218 to connect to the secure execution environment 214 may fail. In some embodiments, the attempt by the untrusted user 218 to connect to the secure execution environment 214 may fail at connection initiation, or may fail during key verification, or may fail when a secure execution environment operation is attempted or may fail at other times. In some embodiments, an untrusted user 218 may have permission to perform a subset of activities or commands in connection with the secure execution environment 214 in accordance with one or more system policies. In some embodiments, an untrusted user 218 may be restricted from all access to the secure execution environment 214 and may also be restricted from all access to the applications and data 216 stored within the secure execution environment 214.

Computer system services 226 may attempt to access 228 functionality associated with the secure execution environment 214 and/or may attempt to access applications and data 216 stored therein. Computer system services 226 are other services (e.g., applications) running within the computer system 212. In some embodiments, one or more of the computer system services 226 may be trusted as a result of having possession of an access key associated with a secure execution environment 214 as described herein above. Such trusted computer system services may have access to the secure execution environment 214 and/or to applications and data 216 stored within the secure execution environment 214.

In some embodiments, one or more of the computer system services 226 may be untrusted as a result of not having possession of an access key associated with a secure execution environment 214 as described herein above. Such untrusted computer system services may not have access to functionality associated with the secure execution environment 214 and/or to applications and data 216 stored within the secure execution environment 214, or may have partial access to functionality associated with the secure execution environment 214, or may have partial access to applications and data 216 stored within the secure execution environment 214 or may have a combination of these and/or other access levels. For example, one or more computer system services 226 may have permission to query the secure execution environment 214 and/or may have permission to request trusted status from the secure execution environment 214, but may not be granted any other permissions associated with the secure execution environment 214. In some embodiments, one or more of the computer system services may be trusted computer system services 240 and may be configured to have access to functionality associated with the secure execution environment 214 via connection 242 and/or to applications and data 216 operating within the secure execution environment 214.

One or more untrusted provider services 230 operating within the computing resource service provider environment may attempt to access functionality associated with the secure execution environment 214 using one or more connections 232. As with trusted provider services 234, untrusted provider services 230 may be operating on computer systems within the computing resource service provider 210 environment. A provider service may be untrusted as a result of not having possession of an access key associated with a secure execution environment 214 as described herein. As indicated in the example illustrated in FIG. 2, the attempt by one of the untrusted provider services 234 to connect to the secure execution environment 214 may fail at, for example, connection initiation, key verification, when a secure execution environment operation is attempted or at other times. As with an untrusted user 218, untrusted provider services 230 may have permission to perform a subset of activities or commands in connection with the secure execution environment 214 in accordance with one or more system policies. In some embodiments, untrusted provider services 230 may be restricted from all access to functionality associated with the secure execution environment 214 and may also be restricted from all access to the applications and data 216 stored within the secure execution environment 214.

Figure 3:
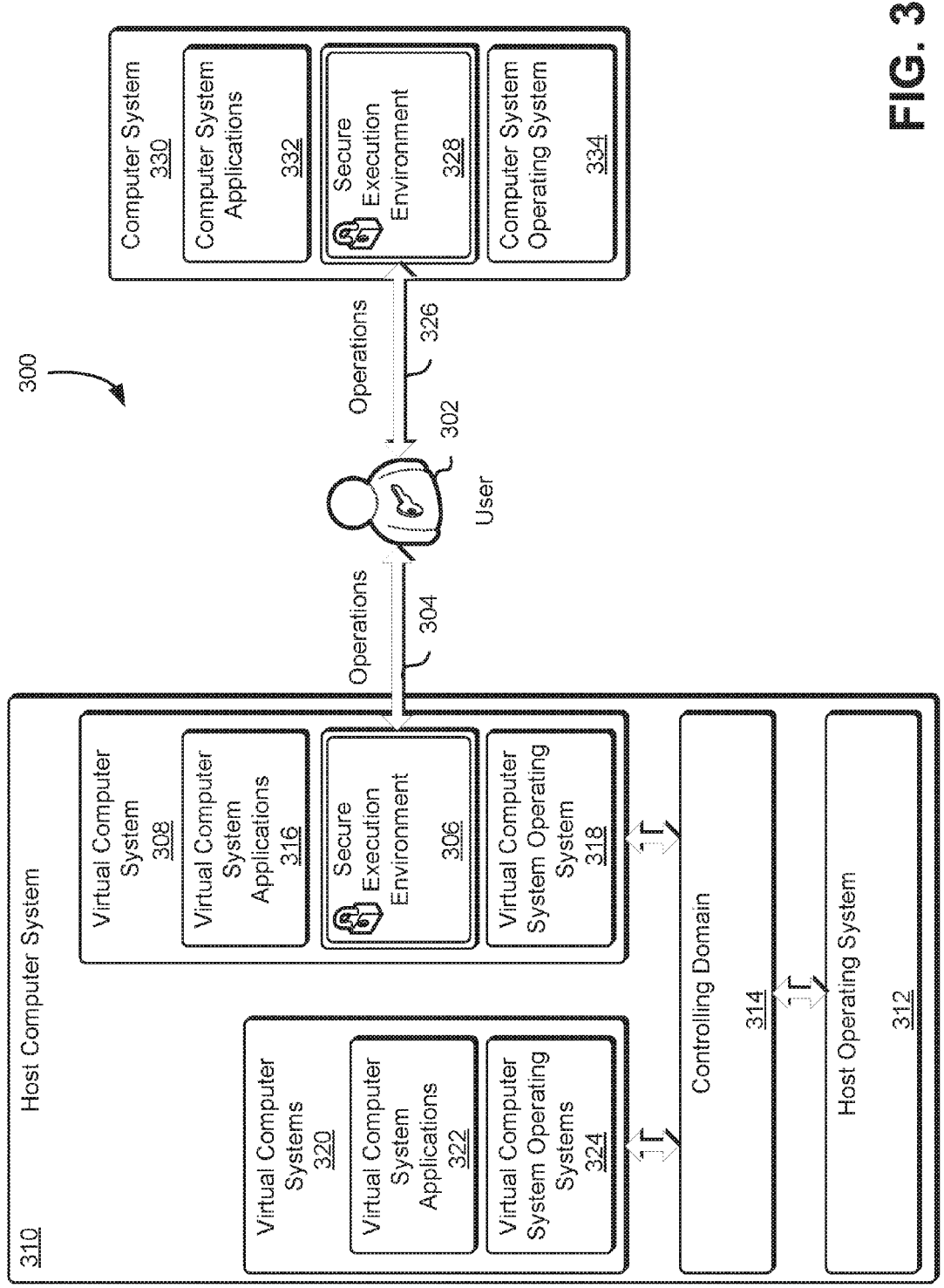
FIG. 3 illustrates an example environment where operations may be performed on secure execution environments in accordance with an embodiment.

FIG. 3 illustrates an example environment 300 where a user may perform one or more secure execution environment operations on secure execution environments as described herein in connection with FIG. 2 and in accordance with an embodiment. A user 302 may execute one or more secure execution environment operations 304 associated with a secure execution environment 306 on a virtual computer system 308. The virtual computer system 308 may be one of one or more virtual computer systems operating on a host computer system 310. The host computer system 310 may be operating within a computing resource service provider environment such as the computing resource service provider 210 as described herein in connection with FIG. 2 and in accordance with an embodiment. The secure execution environment 306 may include applications and data such as the applications and data 216 described herein in connection with FIG. 2 and in accordance with an embodiment.

The user 302 may also execute one or more secure execution environment operations 326 associated with a secure execution environment 328 on a computer system 330. The computer system 330 may be one of one or more computer systems operating within a computing resource service provider environment such as the computing resource service provider 210 as described herein in connection with FIG. 2 and in accordance with an embodiment. The secure execution environment 328 may include applications and data such as the applications and data 216 described herein in connection with FIG. 2 and in accordance with an embodiment. The secure execution environment operations 304 and the secure execution environment operations 326 may include one or more secure execution environment operations for administering secure execution environments and/or the applications and/or data contained therein. Secure execution environment operations may include creating secure execution environments, destroying secure execution environments, measuring secure execution environments, populating secure execution environments, growing secure execution environments, starting secure execution environments, stopping secure execution environments, describing secure execution environments, updating secure execution environments, generating keys for secure execution environments, sending data to secure execution environments, receiving data from secure execution environments, starting applications within secure execution environments, stopping applications within secure execution environments and/or other secure execution environment operations.

For example, a user may execute a secure execution environment operation to create a secure execution environment such as the secure execution environment 306 within the virtual computer system 308 on the host computer system 310. The operations to create (or build) a secure execution environment may include operations to allocate a secure execution environment location, operations to load values into the secure execution environment, operations to measure those stored values. Further operations may include operations to remove the secure execution environment when it is finished, enter, resume and exit the secure execution environment, perform memory paging, debug the secure execution environment and generate secure execution environment keys. For example, a user may use a secure execution environment by first issuing API calls to create a secure execution environment. Then the user may then add memory pages to the secure execution environment which may contain data and/or executable code. The user may next measure the secure execution environment and, if the measurement indicates that the secure execution environment is valid, the user may finalize initiation of the secure execution environment. During the lifecycle of the secure execution environment, the user may start and stop the applications in the secure execution environment and perform other operations such as those described herein. When the secure execution environment is no longer needed, the user may finally cause it to be removed from the system.

The user, which may now be a trusted user as a result of acquiring an access key as a result of creating the secure execution environment as described herein, may then install and start an application such as an agent (as described herein) on the secure execution environment which may, in turn, upload data and/or other applications within the secure execution environment. The agent may be configured to decrypt uploaded data and/or applications and may also be configured to validate such uploaded data and/or applications as described herein. As resource needs for the secure execution environment increase or decrease, the size of the secure execution environment and/or the resources associated with the secure execution environment may be increased or decreased as required, using one or more other secure execution environment operations. When the secure execution environment is no longer needed, it may be depopulated and/or destroyed as needed, using one or more other secure execution environment operations. As may be contemplated, the secure execution environment operations described herein are illustrative examples and other secure execution environment operations may be considered as within the scope of the present disclosure.

As described herein, a secure execution environment such as secure execution environment 306 or secure execution environment 328 may not allow access to functionality associated with the secure execution environments by any entity except trusted entities as described herein in connection with FIG. 2 and in accordance with an embodiment. For example, entities on the virtual computer system 308 such as virtual computer system applications 316, virtual computer system operating system 318 or other entities may not access applications or data stored within secure execution environment 306 unless they are trusted by the secure execution environment 306. Additionally, entities that have privileged access to the host computer system 310 such as controlling domain 314 or host operating system 312 also may not access applications or data stored within secure execution environment 306 unless they are trusted by the secure execution environment 306. Similarly, entities operating on computer system 330 such as computer system applications 332 and entities that have privileged access to the computer system 330 such as computer system operating system 334 also may not access applications or data stored within secure execution environment 328 unless they are trusted by the secure execution environment 328. In the example environment illustrated in FIG. 3, a connection for performing secure execution environment operations 304 is illustrated between a user 302 and a secure execution environment 306 and another connection for performing secure execution environment operations 326 is illustrated between the user 302 and a secure execution environment 328. In some embodiments a secure execution environment such as the secure execution environment 306 may be directly connected to a secure execution environment such as the secure execution environment 328 without an intervening user, service, process, application, and/or other entity. In such embodiments, the secure execution environment 306 may be trusted by (or not isolated from) the secure execution environment 328 and in such embodiments, the secure execution environment 328 may be trusted by (or not isolated from) the secure execution environment 306.

Figure 4:
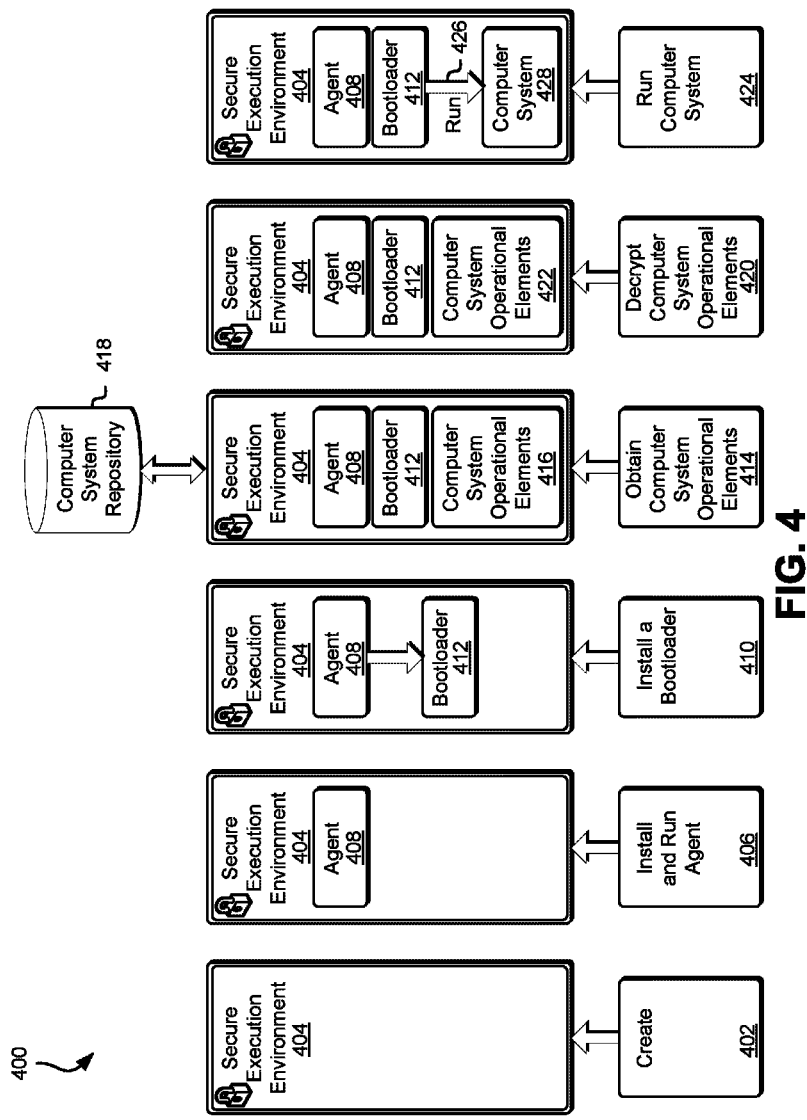
FIG. 4 illustrates an example environment where secure execution environment operations may be performed in accordance with an embodiment.

FIG. 4 illustrates an example environment 400 where secure execution environment operations may be executed on a secure execution environment operating as a service as described herein in connection with FIG. 2 and in accordance with an embodiment. A secure execution environment operation to create 402 a secure execution environment may be sent to one or more applications, processes, modules and/or other such entities configured to perform secure execution environment operations as described herein in connection with FIG. 2 and in accordance with an embodiment. As a result of the secure execution environment operation to create 402 a secure execution environment, a secure execution environment 404 may be created and made available to users and/or services within a computing resource service provider environment. A secure execution environment operation to install and run an agent 406 may then be executed on the secure execution environment 404 and as a result of that operation, an agent 408 may then be instantiated within the secure execution environment 404.

An agent 408 may be instantiated on a computer system (e.g., within a secure execution environment 404 on the computer system) to provide secure execution environment functionality. The agent 408 may be instantiated on the computer system by a second computer system which may be configured to instantiate an agent on the computer system. The agent 408 may be instantiated on the second computer system in response to a request by the first computer system. The agent 408 may be code that may be verified by a computing resource service provider, or may be verified by the customer, or may be verified by a third-party or may be verified by another entity. The agent 408 may also be configured to provide one or more other measurements (also referred to herein as "cryptographic measurements") of the secure execution environment to the customer that created the secure execution environment so that, for example, secondary verifications of the integrity of the secure execution environment may performed by the customer, the computing resource service provider, a third party or another entity.

In some embodiments, the agent 408 may be configured to perform one or more secure execution environment operations on the secure execution environment 404 so that the secure execution environment 404 may be further configured to provide desired functionality. The agent 408 may be configured to perform the one or more operations as a result of receiving one or more external commands, or may be configured to perform the one or more operations as a result of one or more commands specified by the agent or may be configured to perform the one or more operations as a result of a combination of external commands and commands specified by the agent. For example, the agent 408 may execute a secure execution environment operation to install a bootloader 410 which may, in turn, be configured to locate and/or instantiate the applications and/or data to be installed within the secure execution environment by the bootloader.

As described herein, a bootloader is an application, process, module or other entity configured to locate and instantiate executable code and/or data within a computer system. The agent may first receive the bootloader, may then decrypt the bootloader if it had been previously encrypted and may finally verify the bootloader using one or more measurements of the bootloader. In some embodiments, the agent may be configured to provide measurements of the bootloader once it has been instantiated within the secure execution environment by pausing and/or otherwise freezing the secure execution environment and obtaining one or more measurements from specialized instructions running on the host CPU, which may in turn be verified within the secure execution environment or may be sent outside the secure execution environment in encrypted form, to be stored and/or validated. In some embodiments, the agent may implement the bootloader functionality itself (i.e., be the same application as the bootloader). As used herein, and unless otherwise made clear from context, the terms "agent" and "bootloader" may be used interchangeably to describe an application, process, module or other entity configured to locate and instantiate executable code and/or data within a secure execution environment operating on a computer system. In some embodiments, the agent bootloader functionality may be instantiated within the secure execution environment upon instantiation of the secure execution environment.

The applications and/or data to be installed within the secure execution environment by the bootloader may include any applications and/or data as may be required by the customer. In the example illustrated in FIG. 4, the applications and data may include elements such as computer system operational elements to instantiate computer system service functionality within the secure execution environment. For example, a customer may require functionality to store a collection of cryptographic keys within the secure execution environment relating to access to certain encrypted data stored within the computer system. The bootloader may instantiate an application to receive requests for new keys, store keys within a file, remove keys from the file, and to provide encrypted copies of those cryptographic keys to authorized users. The bootloader may also instantiate a file of preloaded keys that may be stored within the secure execution environment and may only be sent outside the secure execution environment using an encryption schema that may only be decrypted by a user with proper credentials as associated with the secure execution environment. The cryptographic keys may remain safe from being intercepted by any other entity within the computer system, thus ensuring the security of the certain encrypted data. The cryptographic keys may be used to secure memory writes to memory within the secure execution environment so that the memory is not readable by any entity outside of the secure execution environment. Private cryptographic keys may be protected by (i.e., stored within) the secure execution environment and may have corresponding public cryptographic keys that may be made available outside of the secure execution environment. Data may then be encrypted outside of the secure execution environment using the public cryptographic key and decrypted within the secure execution environment using the private cryptographic key. A bootloader may also install more complicated applications and data within the secure execution environment including entire virtual computer system instances. In some embodiments, a secure execution environment may be created with a virtual computer system instance preloaded and configured to run.

Applications and/or data installed in a secure execution environment may also include applications to provide access to and/or to process other types of sensitive data. For example, applications may be installed to emulate hardware, provide network connections, provide access to restricted data types, provide other encryption methodologies, and/or other application types. Such applications may be instantiated in secure execution environments using typical installation methods as described herein, or as instantiated as device drivers, or as kernel modules, or as virtual hardware and/or other instantiation methods. Applications may be migrated from controlling domains or from a host operating system, or from secured computer system domains or from combinations of these and/or other locations. Applications may also be converted to secure execution environment versions by altering one or more aspects of the application. For example, an payment processing application running as a web service on a computer system such as a computer system provided by a computing resource service provider may be converted to run as a secured service within a secure execution environment by first suspending the application, then measuring the application, then converting the application to enable access to secure execution environment functionality, then encrypting the application, then migrating the application to the secure execution environment and finally by decrypting and restoring the application to run within the secure execution environment. A web service application may be an application that is configured to run within a computing resource service provider environment and that is configured to provide services to one or more client applications using an interface such as a web interface of a network such as the Internet.

In some embodiments, the bootloader 412 installed by the secure execution environment operation to install a bootloader 410 may be configured to locate and install one or more computer system operational elements. As used herein, the term "computer system operational elements" may refer to computer system applications, computer system data, computer system data associated with computer system applications, programs, modules, sets of executable instructions or combinations of these and/or other elements. In some embodiments, the bootloader 412 may be a separate application from the agent 408. In some embodiments, the bootloader 412 may be the same application as the agent 408.

The agent 408 and/or the bootloader 412 may be further configured to perform one or more secure execution environment operations to locate and obtain computer system operational elements 414. The computer system operational elements 416 may be obtained from a computer system repository 418 which may contain a plurality of such computer system operational elements. In some embodiments, the computer system operational elements 416 may be obtained as a single block of data which may specify the computer system. In some embodiments, the computer system operational elements 416 may be obtained as a plurality of blocks of data, each block of data specifying one or more parts of the computer system such as data, applications, drivers, network connections, resource requirements, policies, and/or other computer system operational elements. In some embodiments, the computer system operational elements 416 may be retrieved from the computer system repository 418 in response to receiving one or more commands. The one or more commands may be issued by the agent 408, the bootloader 412, or another entity. The one or more commands may be issued as webservice commands, API calls, library calls, or another command methodology.

Retrieving the computer system operational elements from the computer system repository 418 may include retrieving computer system images (e.g., kernel images) directly or using a bootloader as described herein. The computer system operational elements may include computer system images which may include a secure execution environment or may include computer system images which may be configured to create a secure execution environment. The computer system operational elements may include specifications for processes configured to create a secure execution environment using, for example, a device driver and/or or a kernel module. As may be contemplated, the types of computer system operational elements as described herein, the methods for retrieving those computer system operational elements as described herein and the locations that those computer system operational elements are retrieved from as described herein are illustrative examples and other types of computer system operational elements, methods for retrieving those computer system operational elements and the locations that those computer system operational elements are retrieved from may be considered as within the scope of the present disclosure.

In some embodiments, the computer system operational elements 416 may be encrypted. In such embodiments, the agent 408 and/or the bootloader 412 may be configured to perform one or more operations to decrypt the computer system operational elements 420 to produce the decrypted computer system operational elements 422. Finally, the agent 408 and/or the bootloader 412 may be configured to perform one or more operations to run one or more applications associated with the computer system 424. In some embodiments, the bootloader 412 may execute a command instructing the computer system 428 to run 426, thereby starting the one or more applications associated with the computer system 428.

Figure 5:
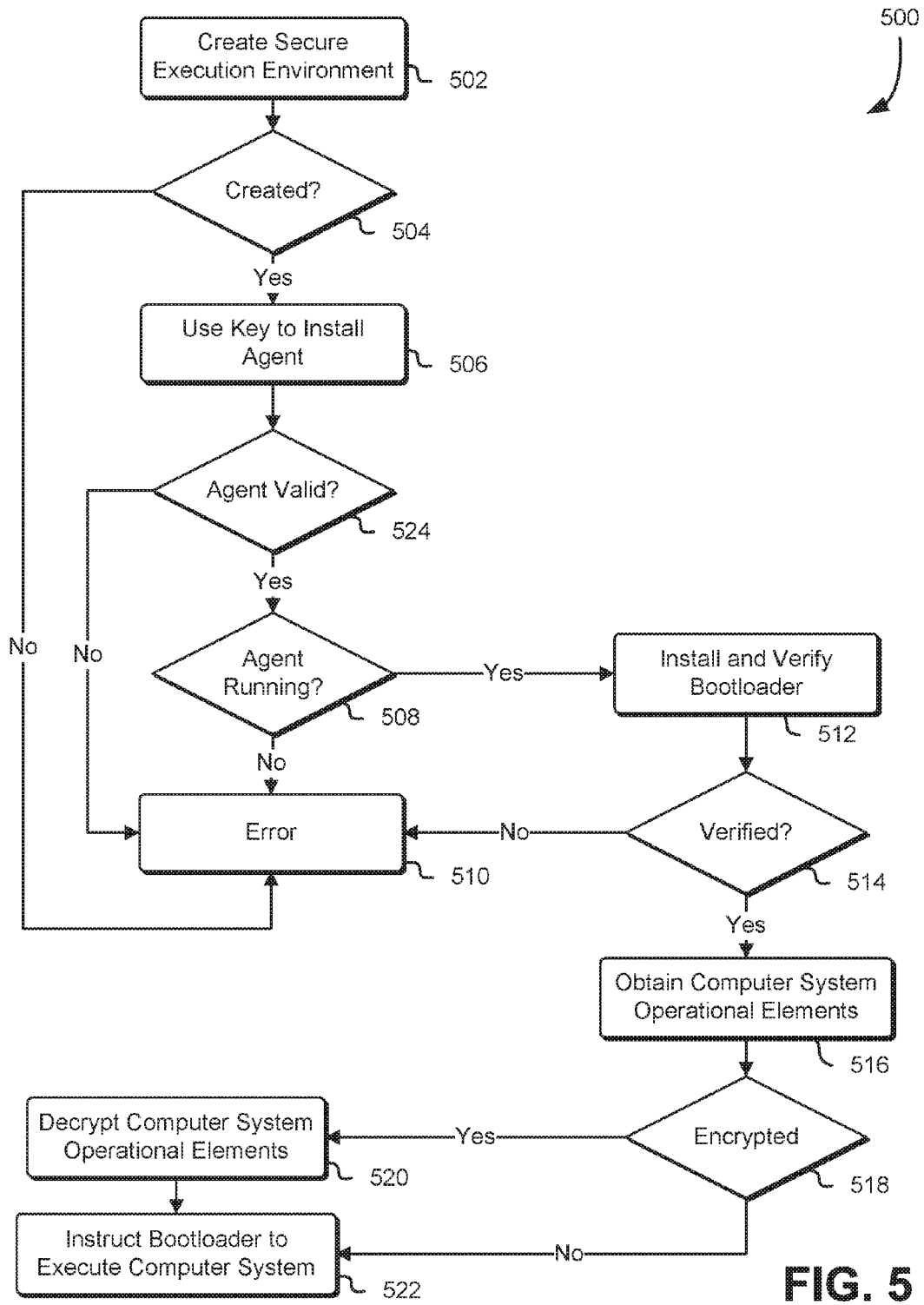
FIG. 5 illustrates an example process for instantiating and populating a secure execution environment in accordance with an embodiment.

FIG. 5 illustrates an example process 500 for instantiating and populating a secure execution environment as described herein in connection with FIG. 2 and in accordance with an embodiment. An application or other entity configured to provide secure execution environment functionality such as a compute service 124 described herein in connection with FIG. 1 may perform at least a portion of the process illustrated in FIG. 5. An agent such as the agent 408 described herein in connection with FIG. 4 may perform at least a portion of the process illustrated in FIG. 5. Other entities operating with a computer system environment may also perform at least a portion of the process illustrated in FIG. 5.

A compute service may receive a command to create a secure execution environment 502. The secure execution environment may be created as described herein and, if successfully created 504, the one or more keys associated with the secure execution environment may be used to install an agent 506 such as the agent 408 described herein in connection with FIG. 4 and in accordance with an embodiment. After the agent is installed, the compute service may cause one or more operations to be performed within the secure execution environment to determine whether the agent is valid 524. In some embodiments, the one or more operations may include one or more operations to provide one or more measurements of the contents of the secure execution environment. If the secure execution environment is not successfully created, installed, executed, and validated, the compute service and/or the agent may, in some embodiments, enter an error state 510 which may be reported to one or more users, services, processes and/or other computer system entities. In some embodiments, the validity of the secure execution environment may be measured at one or more points during the secure execution environment instantiation process illustrated in FIG. 5. For example, the secure execution environment validity may be measured after instantiation, installation of the agent, installation of other applications and/or at other times during instantiation.

If the agent is successfully created, validated and is running 508, the agent may then install and verify a bootloader 512. Computer system operational elements 516 may then be obtained by the bootloader to instantiate applications and/or data within the secure execution environment. If the bootloader is not successfully verified 514, the agent may enter an error state 510 which may be reported to one or more users, services, processes and/or other computer system entities. The bootloader may then determine whether the computer system operational elements are encrypted 518 and if so, the computer system operational elements may be decrypted 520. Finally, the bootloader may execute the computer system 522 by, for example, starting one or more applications within the secure execution environment. In some embodiments, the agent and/or the bootloader may continue to obtain computer system operational elements 516 and, if encrypted 518, the computer system operational elements may be decrypted 520 before causing them to execute. This process may continue until the computer system elements are completely instantiated.

Figure 6:
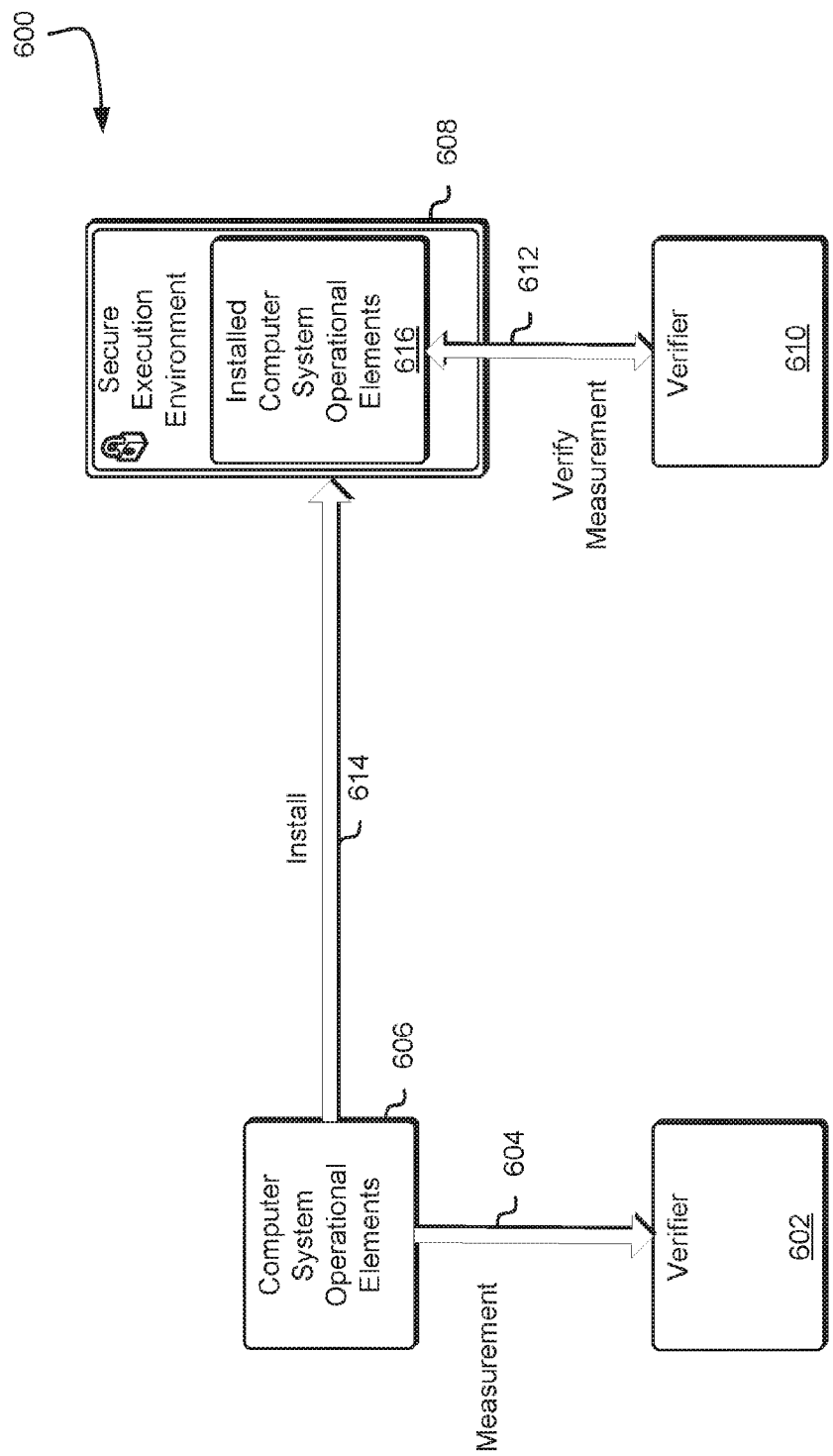
FIG. 6 illustrates an example environment where computer system operational elements may be verified in connection with a secure execution environment in accordance with an embodiment.

FIG. 6 illustrates an example environment 600 where a service may verify computer system operational elements to be installed in a secure execution environment and may verify that those computer system operational elements were correctly installed in a secure execution environment after installation as described herein in connection with FIG. 2 and in accordance with an embodiment. Prior to being installed in a secure execution environment, computer system operational elements 606 may be measured and the measurement may be sent to a verifier 602 to be verified 604. Computer system operational elements 606 may include data, applications, drivers, network connections, resource requirements, policies, and/or other computer system operational elements. Computer system operational elements 606 may be verified 604 by comparing the elements to known elements to, for example, verify that data has not been tampered with or to verify that malicious applications are not being installed in the secure execution environment. Computer system operational elements 606 may be verified 604 by obtaining one or more measurements relating to the computer system operational elements. Measurements may be in various forms, such as hash values (e.g., values of one or more hashing functions), message authentication codes, digital signatures, and the like. The computer system operational elements 606 may be verified by a verifier 602. In some embodiments, the verifier 602 may be a trusted user (e.g., trusted automated process), untrusted user, or third party.

After the computer system operational elements 606 have been verified 604, the computer system operational elements 606 may be installed 614 in the secure execution environment 608. The installed computer system operational elements 616 may then be verified 612 by a verifier 610 by, for example, comparing one or more measurements to one or more of the measurements obtained by the verifier 602 to one or more measurements obtained from the secure execution environment 608. In some embodiments, the secure execution environment 608 may be verified as a unit. In some embodiments, only the installed computer system operational elements 616 may be verified. In some embodiments, the secure execution environment and/or one or more applications running thereon may be paused before verification. In some embodiments, the verifier 602 and the verifier 610 may be the same entity.

Figure 7:
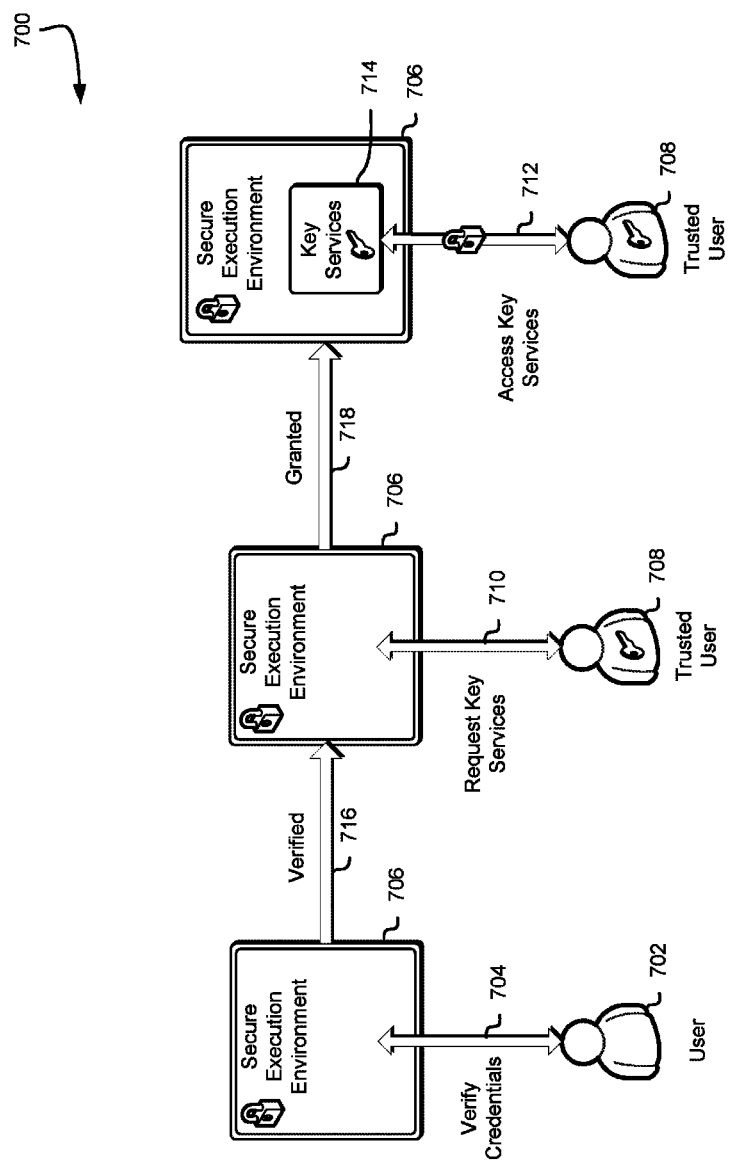
FIG. 7 illustrates an example environment where key services may be provided in accordance with an embodiment.

FIG. 7 illustrates an example environment 700 where a user may request access to key services within the secure execution environment, which may be used to enable access to applications and/or data from within a secure execution environment as described herein in connection with FIG. 2 and in accordance with an embodiment. A user 702 may perform one or more key service operations to verify that user's credentials 704 in association with a secure execution environment 706. The one or more key service operations to verify that user's credentials 704 may include one or more operations executed within the secure execution environment 706. The credentials may be credentials associated with access to the secure execution environment 706, or may be credentials associated with an application, process, module and/or another entity running within the secure execution environment 706, or may be credentials associated with performing one or more operations on the secure execution environment 706, or may be credentials associated with performing one or more operations on applications and data within the secure execution environment 706 or may be combinations of these and/or other credentials. The credentials may include public credentials supplied by the secure execution environment as, for example, a public certificate as well as private credentials stored within the secure execution environment as, for example, a hardware-supported cryptographic key.

If the credentials are verified 716, the user may be considered a trusted user 708. A trusted user may have access to further secure execution environment functionality as described herein. The trusted user 708 may then use secure execution environment functionality to request access to key services 710 from the secure execution environment 706. If the access to key services is granted 718, the trusted user 708 may then use 712 the key services 714. The key services 714 may include access to keys associated with the secure execution environment 706, or may include access to keys associated with applications and/or data within a secure execution environment 706 or may include access to other keys. For example, key services 714 may be configured to provide an encrypted cryptographic key to the trusted user 708 such that the encrypted cryptographic key may only be decrypted by a trusted user. Data may then be sent from the secure execution environment 706 in an encrypted form which may only be decrypted with the cryptographic key. Such encrypted data may be safely transported outside of the secure execution environment while still remaining secure from other entities as only a trusted user may decrypt the cryptographic key and thus, only a trusted user may decrypt the encrypted data.

Figure 8:
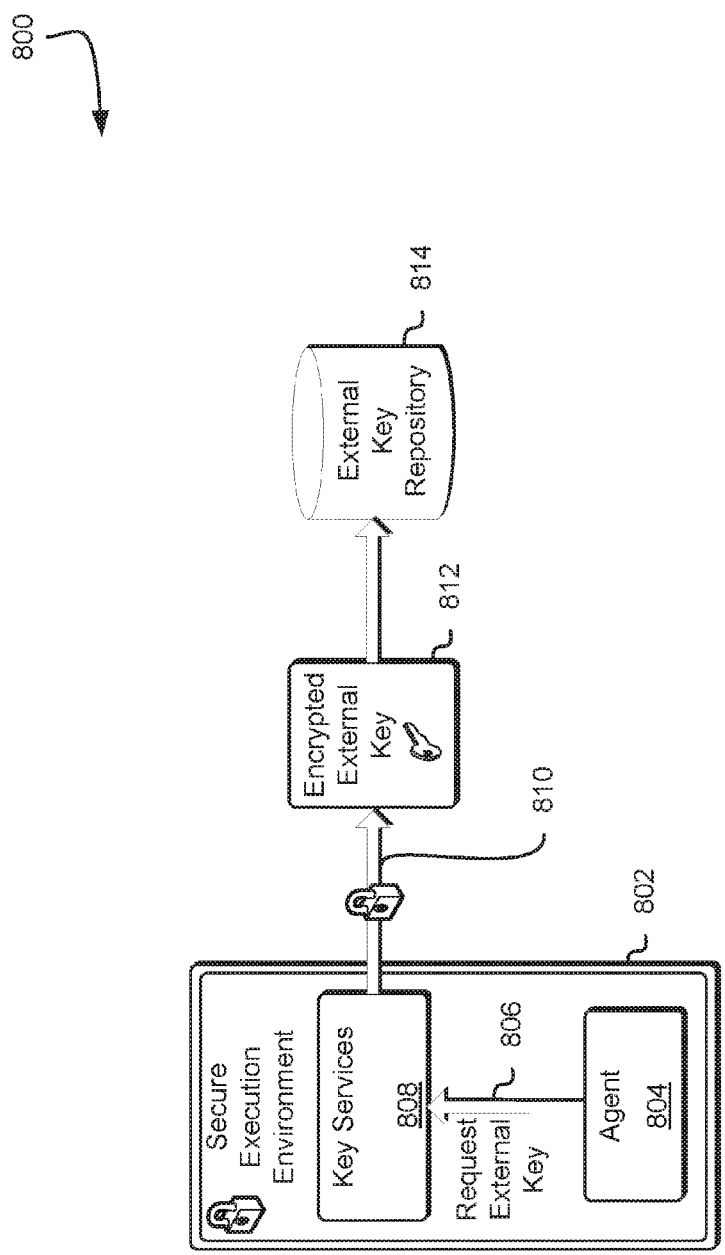
FIG. 8 illustrates an example environment where encrypted key may be stored outside a secure execution environment in accordance with an embodiment.

FIG. 8 illustrates an example environment 800 where an encrypted key may be stored outside a secure execution environment as described herein in connection with FIG. 7 and in accordance with an embodiment. An agent 804 running within a secure execution environment 802 may request an external key 806 from key services 808 such as the key services 714 described herein in connection with FIG. 7 and in accordance with an embodiment. The key services 808 may produce 810 an encrypted external key 812 which may be stored in an external key repository 814. The encryption for the encrypted external key 812 may be based at least in part on data obtained from the secure execution environment 802 such as, for example, a private hardware supported cryptographic key and/or a corresponding public certificate. The external key repository 814 may be accessed by trusted users and services as well as by untrusted users and services. Only trusted users with access to the secure execution environment 802 may be able to decrypt the encrypted external key 812 thus enabling the use of the encrypted external key 812 to securely transmit data out of the secure execution environment 802.

Figure 9:
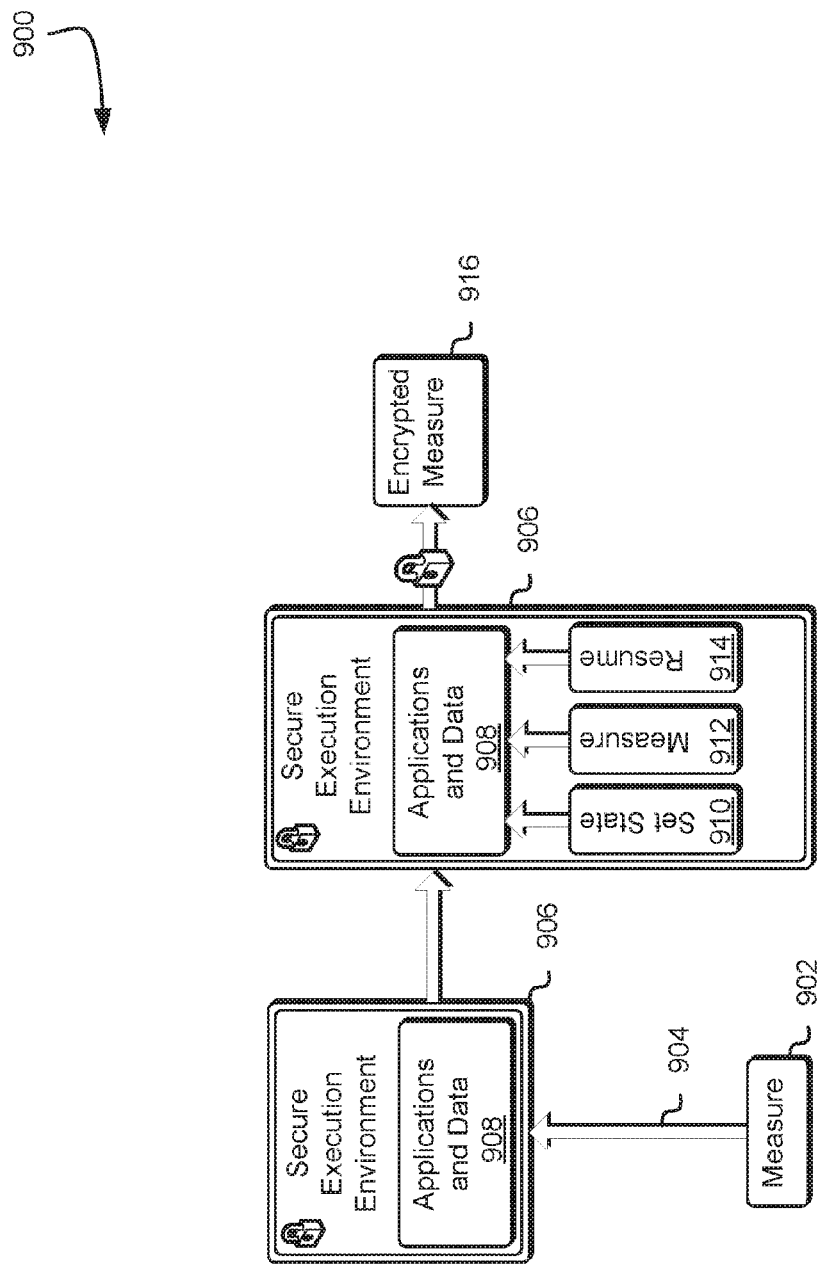
FIG. 9 illustrates an example environment where the contents of a secure execution environment may be verified in accordance with an embodiment.

FIG. 9 illustrates an example environment 900 where the contents of a secure execution environment may be verified as described herein in connection with FIG. 2 and in accordance with an embodiment. A secure execution environment operation to measure 902 applications and data 908 within a secure execution environment 906 may be sent 904 to the secure execution environment 906. The secure execution environment operation to measure 902 the applications and data 908 within the secure execution environment 906 may be requested by a trusted user, or by a trusted service or by another entity that may be allowed to request such a secure execution environment operation. As a result of receiving such a secure execution environment operation, the applications within the secure execution environment 906 may first be set to a known state 910, then the secure execution environment 906 may be measured 912 and then the applications within the secure execution environment 906 may be resumed 914. The known state 910 may be a paused state or another known state. The measure may measure installed code, or may measure executing code, or measure a system stack, or may measure one or more registers, or may measure stored data or may measure a combination of these and/or other state values. The applications and data 908 within the secure execution environment 906 may be measured 912 using Intel® SGX instructions, TPM instructions or other dedicated hardware instructions. In some embodiments, the resulting measurement may be stored within the secure execution environment 906 and in some embodiments the resulting measurement may be encrypted and the encrypted measure 916 may be stored outside of the secure execution environment using secure encryption and storage techniques such as those described herein in connection with FIGS. 7 and 8.

Measurements (e.g., the encrypted measure 916) may be evaluated within the secure execution environment or may be sent outside of the secure execution environment. A secure execution environment may be configured such that measurements are performed entirely within a secure portion of the CPU and may also be configured so that the measurements are signed by secret material provided by the CPU such as, for example, by microcode running on the CPU. In this way, measurements may be verified as correct by users using functionality provided in association with the secure execution environment. Measurements may be verified by, for example, an API which may provide information usable to determine the state of a processor wherein such information may be cryptographically verified as having been validated by a trusted entity such as the processor, a trusted platform module or other trusted entity. In some embodiments, a measurement may be unique to the version of the microcode. In some embodiments, a measurement may be based at least in part on a per-processor key which may specify a certificate. The measurement and/or the results of the measurements may be provided to requestors or customers as a validation certificate, a key, an attestation, or some other such method. An example of a validation certificate is an X.509 certificate (i.e., a certificate based on the X.509 standard) although a validation certificate may be of any form that includes a collection of signed data that may be used for validation purposes. For example, a validation certificate associated with a secure execution environment may be created based on the measurements and sent to the customer so that the customer may verify secure execution environment operations. The validation certificate may be made publicly available (i.e., provided to any entity that requests it) or may be made only to trusted entities. In some embodiments, the certificate may be based at least in part on a common parent such as, for example, a certificate from a computer system, a computer system environment, a computer system provider and/or other common parent. The results may be sent outside the secure execution environment by first encrypting the results using an encryption key generated within the secure execution environment and then by sending the one or more encrypted results to the customer, or to a data store, or to a database, or to a service such as a webservice or to another storage location.

An agent may provide one or more measurements to validate the secure execution environment and the contents of the secure execution environment. These measurements may be based at least in part on measurements obtained from the host computer system hardware such as, for example, measurements obtained from the SGX instructions running on the CPU, or instructions obtained from a TPM. The secure execution environment may be more accurately measured if the secure execution environment has been paused or frozen. A secure execution environment may be paused or frozen by halting the execution of applications running within the secure execution environment and/or by placing those applications in a certain determined state. Pausing and/or freezing applications and/or placing them in a certain determined state may allow external verification that a secure execution environment has not been tampered with by, for example, comparing the measurements to some known values. Measurements may, in some embodiments, include verification and/or validation that the measurement functionality was performed by a trusted, verified, and/or validated source. For example, measurements performed by Intel® SGX instructions running on an Intel® CPU may be verified as coming from a genuine Intel® processor and may be signed by that processor as genuine, with the signature being verifiable as such. Measurements coming from a TPM may include a similar verifiable signature of the measurements, with an assurance that the measurements were performed by the TPM and/or a process running thereon.

Figure 10:
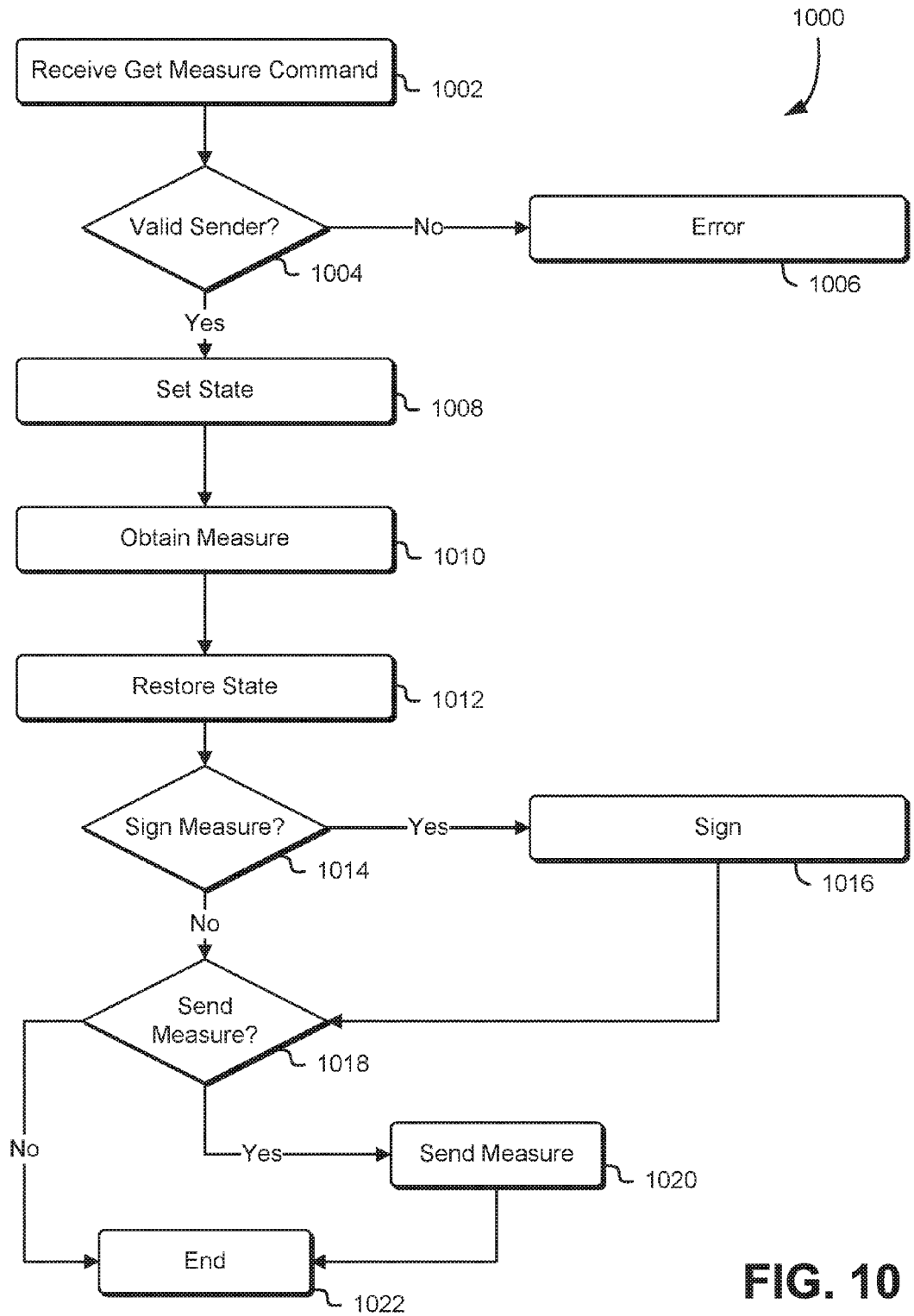
FIG. 10 illustrates an example process for measuring the contents of a secure execution environment in accordance with an embodiment.

FIG. 10 illustrates an example process 1000 for obtaining and storing a measurement of the contents of a secure execution environment in accordance with an embodiment. An agent such as the agent 408 described herein in connection with FIG. 4 may perform at least a portion of the process illustrated in FIG. 10. Other entities operating with a computer system environment may also perform at least a portion of the process illustrated in FIG. 10.

An agent may receive a command to obtain one or more measurements 1002 of the contents of a secure execution environment. If the command was not sent by a valid sender 1004, the agent may enter an error state 1006, which may be entered and reported to one or more users, services, processes and/or other computer system entities. If the command was sent by a valid sender 1004, the agent may set the state 1008 of the of the secure execution environment (such as, for example, by pausing the secure execution environment and/or setting one or more application states for applications within the secure execution environment) and may then obtain one or more measurements 1010 of the contents of the secure execution environment such as the measurements described herein in connection with FIG. 9. The state of the secure execution environment may then be restored 1012. It may next be determined whether to sign the measure 1014 and, if so the measure may be signed 1016. In some embodiments it may also be determined whether to send the measure (or the signed measure) 1018 outside of the secure execution environment and if so, the measure may be sent 1020 before terminating the processing of the command 1022.

Figure 11:
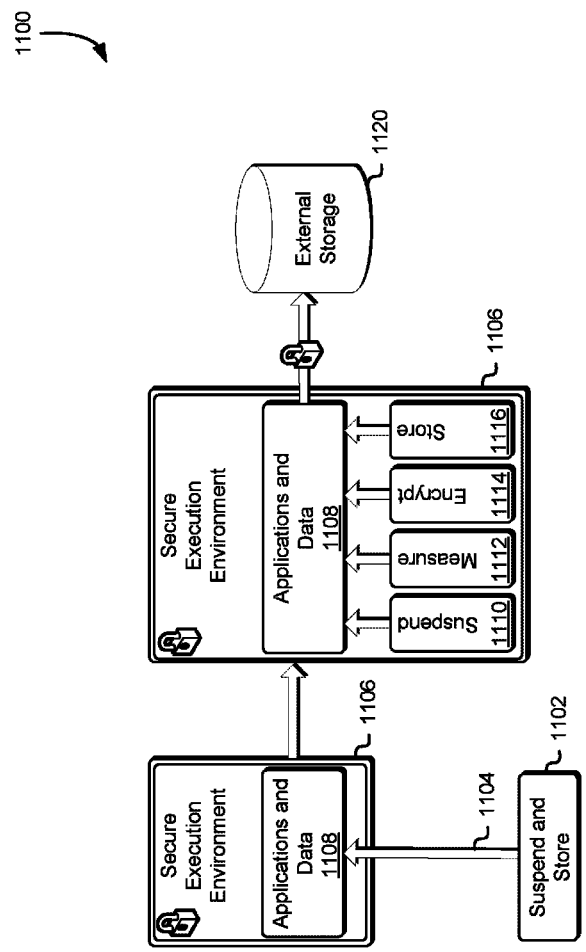
FIG. 11 illustrates an example environment where the contents of a secure execution environment may be securely stored outside the secure execution environment in accordance with an embodiment.

FIG. 11 illustrates an example environment 1100 where the contents of a secure execution environment may be securely stored outside of the secure execution environment as described herein in connection with FIG. 2 and in accordance with an embodiment. A secure execution environment operation to suspend and store 1102 applications and data 1108 running within a secure execution environment 1106 may be sent 1104 to the secure execution environment 1106. The secure execution environment operation to suspend and store 1102 the applications and data 1108 may be requested by a trusted user, or by a trusted service or by another entity that may be allowed to request such a secure execution environment operation. As a result of receiving such a secure execution environment operation, the secure execution environment may first suspend 1110 any applications within the applications and data 1108 in the secure execution environment, then may measure 1112 the applications and data 1108 in the secure execution environment, then may encrypt 1114 the applications and data 1108 in the secure execution environment and finally may store 1116 the encrypted applications and data. The secure execution environment 1106 may measure 1112 the secure execution environment using Intel® SGX instructions, TPM instructions or other dedicated hardware instructions. The secure execution environment 1106 may store 1116 the encrypted applications and data in an external storage location 1120 using secure encryption and storage techniques such as those described herein in connection with FIGS. 7 and 8. In some embodiments, the secure execution environment may also encrypt and store the measure 1112 in the external storage location 1120. In some embodiments the encrypted applications and data may be later retrieved from the external storage location 1120, decrypted, verified, and resumed as described herein.

Figure 12:
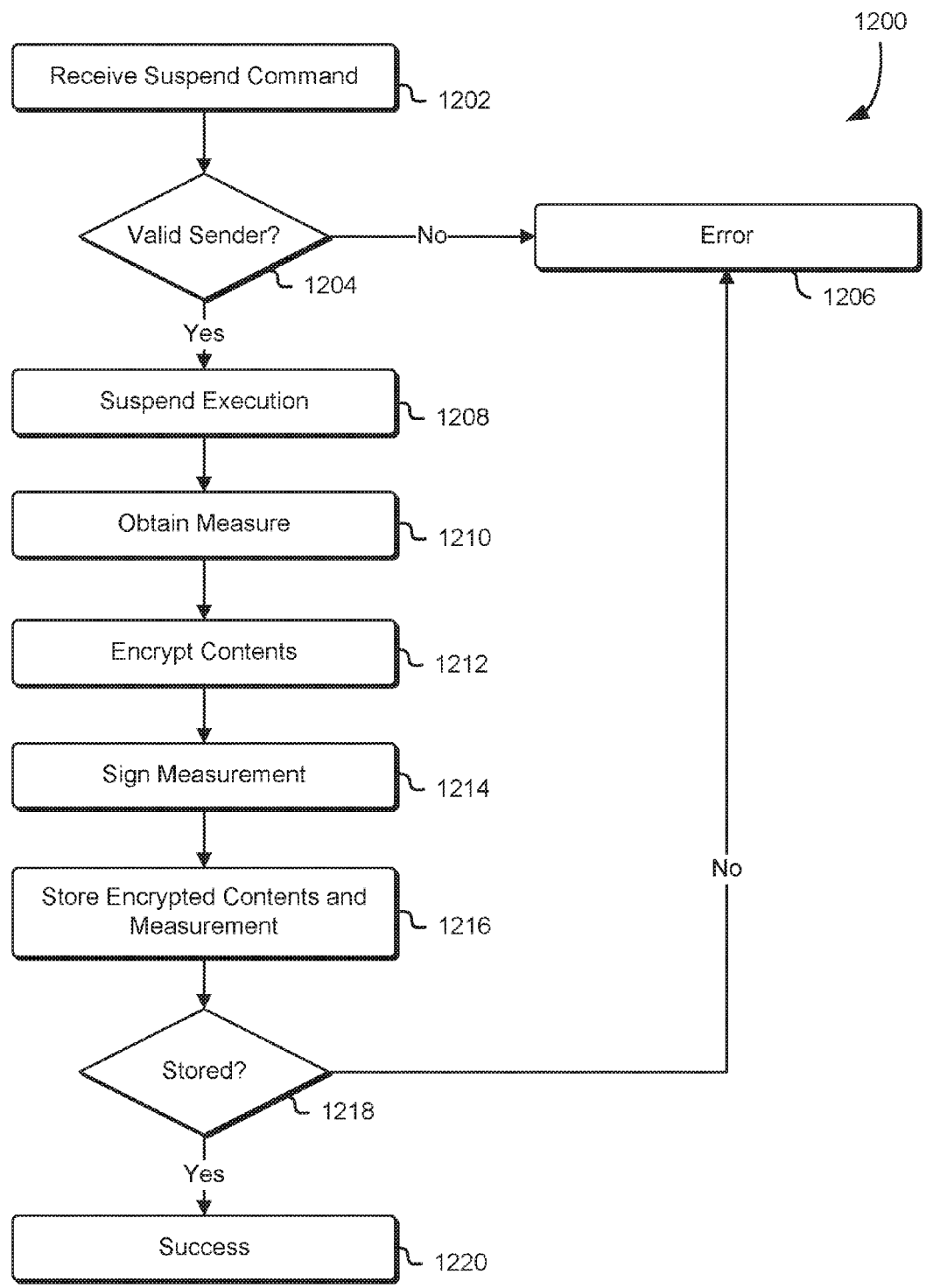
FIG. 12 illustrates an example process for suspending the contents of a secure execution environment in accordance with an embodiment.

FIG. 12 illustrates an example process 1200 for suspending the contents of a secure execution environment as described herein in connection with FIG. 11 and in accordance with an embodiment. An agent such as the agent 408 described herein in connection with FIG. 4 may perform at least a portion of the process illustrated in FIG. 12. A bootloader such as the bootloader 412 described herein in connection with FIG. 4 may also perform at least a portion of the process illustrated in FIG. 12. Other entities operating with a computer system environment may also perform at least a portion of the process illustrated in FIG. 12.

An agent may receive a command to suspend 1202 of the contents of a secure execution environment. If the command was not sent by a valid sender 1204, the agent may, in some embodiments, enter an error state 1206 which may be reported to one or more users, services, processes and/or other computer system entities. If the command was sent by a valid sender 1204, the agent may first suspend execution 1208 of the contents of the secure execution environment and may then obtain one or more measurements 1210 of the contents of the secure execution environment such as the measurements described herein in connection with FIG. 9. The agent may then encrypt the secure execution environment contents 1212, sign the measurement 1214 and store the encrypted secure execution environment contents and measurement 1216 as described herein in connection with FIG. 11 and in accordance with an embodiment. If the encrypted secure execution environment contents and measurement are not successfully stored 1218, the agent may, in some embodiments, enter an error state 1206, which may be reported to one or more users, services, processes and/or other computer system entities. If the encrypted secure execution environment contents and measurement are successfully stored 1218, the agent may, in some embodiments, enter an success state 1220, which may be reported to one or more users, services, processes and/or other computer system entities.

Figure 13:
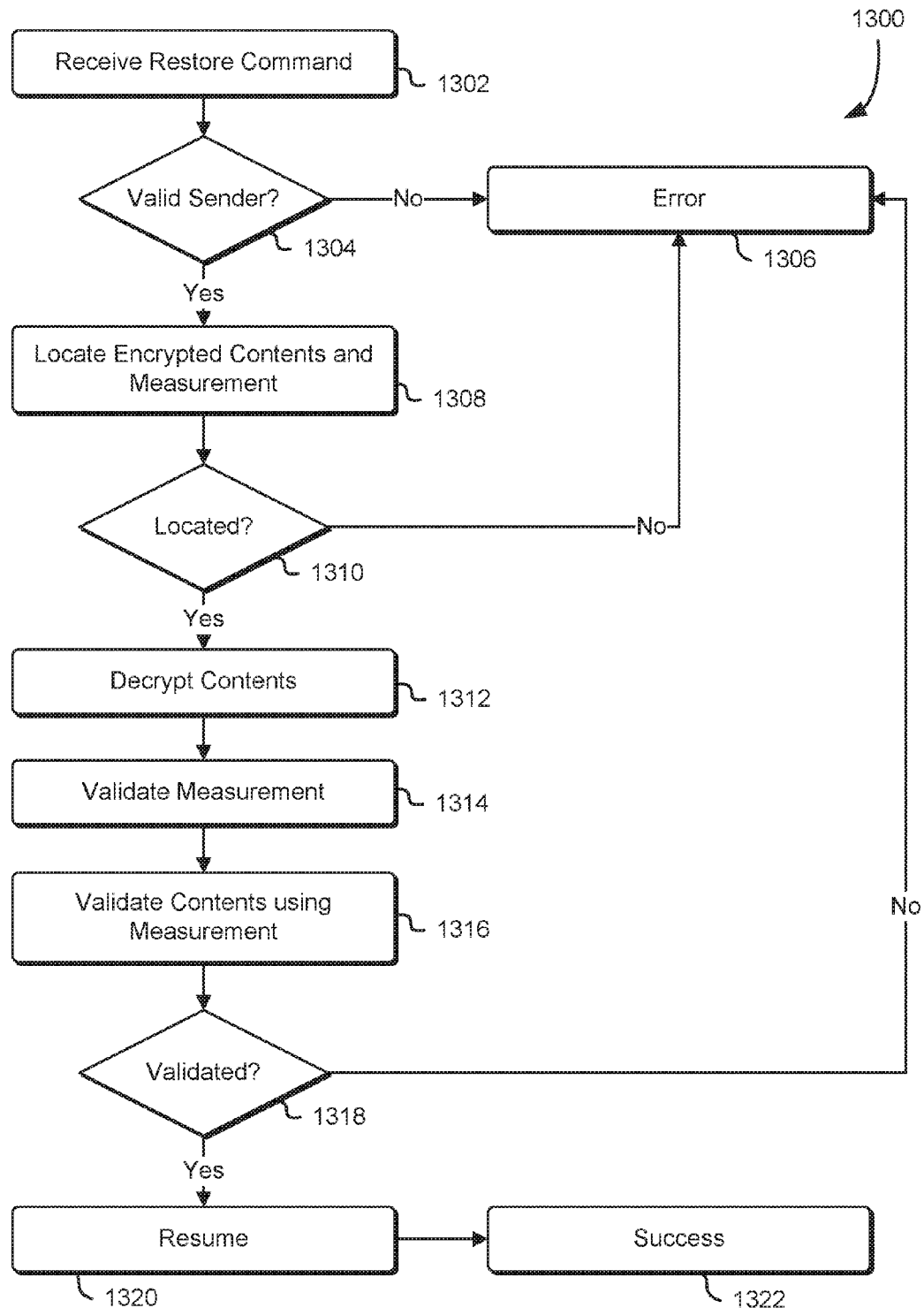
FIG. 13 illustrates an example process for restoring the contents of a secure execution environment in accordance with an embodiment.

FIG. 13 illustrates an example process 1300 for restoring the suspended, encrypted, and stored contents of a secure execution environment as described herein in connection with FIG. 12 and in accordance with an embodiment. An agent such as the agent 408 described herein in connection with FIG. 4 may perform at least a portion of the process illustrated in FIG. 13. Other entities operating with a computer system environment may also perform at least a portion of the process illustrated in FIG. 13.

An agent may receive a command to restore 1302 of the contents of a suspended, encrypted, and stored secure execution environment. If the command was not sent by a valid sender 1304, the agent may, in some embodiments, enter an error state 1306, which may be reported to one or more users, services, processes and/or other computer system entities. If the command was sent by a valid sender 1304, the agent may first attempt to locate the encrypted secure execution environment contents and the measurement 1308 which may, in some embodiments, be stored in an external storage location such as the external storage location 1120 described herein in connection with FIG. 11 and in accordance with an embodiment. If the encrypted secure execution environment contents and measurement are not located 1310, the agent may, in some embodiments, enter an error state 1306, which may be reported to one or more users, services, processes and/or other computer system entities.

If the encrypted secure execution environment contents and measurement are located 1310, the agent may first decrypt the secure execution environment contents 1312, may then validate the measurement 1314 and may finally try to validate that the secure execution environment contents are in the same state as when the secure execution environment contents were suspended 1316. If the secure execution environment contents are not in the same state as when the secure execution environment contents were suspended, it may be an indication that the secure execution environment contents may have been tampered with during storage. If the agent is not able to validate 1318 that the secure execution environment contents are in the same state as when the secure execution environment contents were suspended, the agent may, in some embodiments, enter an error state 1306, which may be reported to one or more users, services, processes and/or other computer system entities. If the agent is able to validate 1318 that the secure execution environment contents are in the same state as when the secure execution environment contents were suspended, the agent may resume the secure execution environment 1320 by, for example, resuming one or more applications within the secure execution environment. The agent may then, in some embodiments, enter a success state 1322, which may be reported to one or more users, services, processes and/or other computer system entities.

Figure 14:
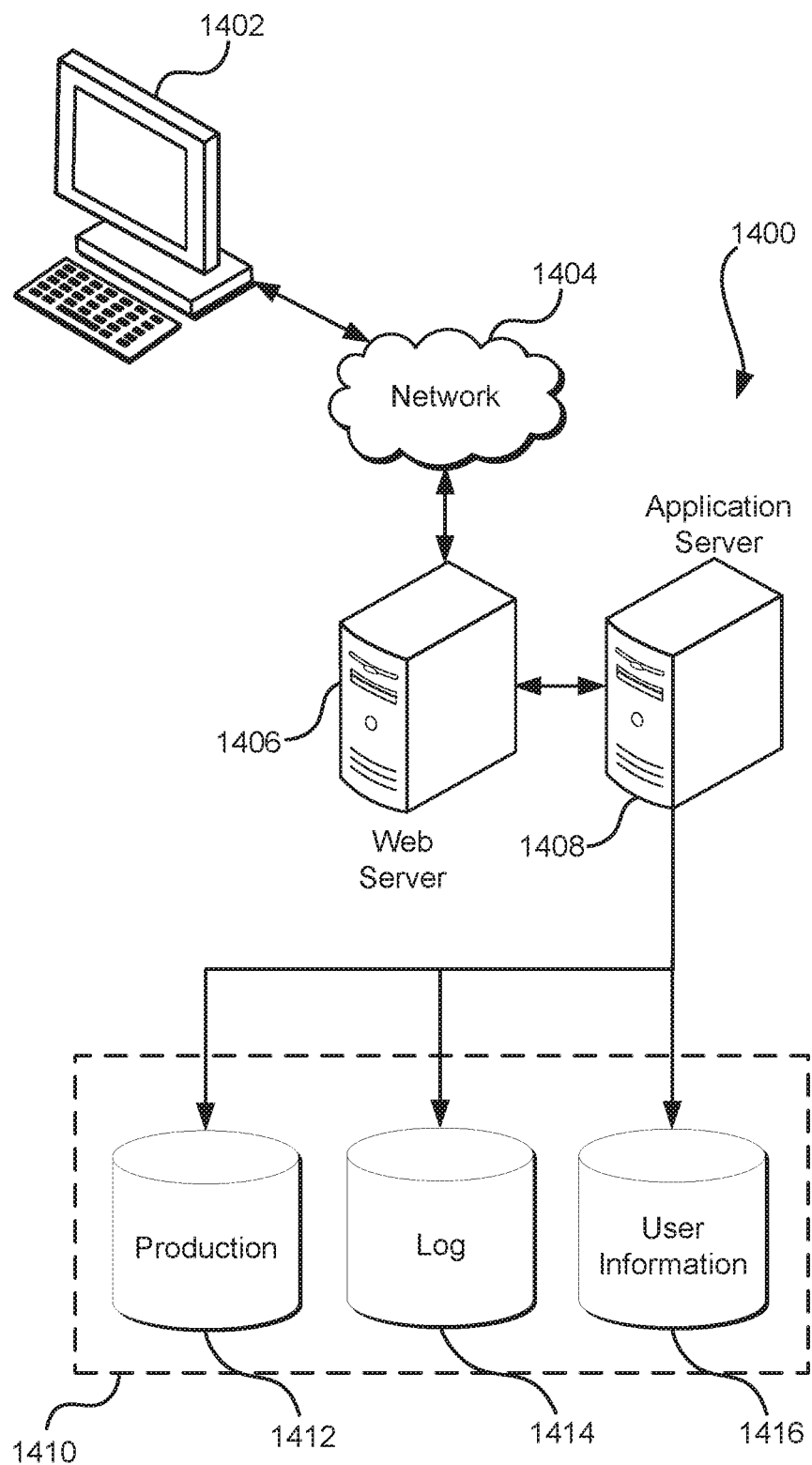
FIG. 14 illustrates an environment in which various embodiments can be implemented.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages, or information over an appropriate network 1404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1406 for receiving requests and serving content in response thereto, although for other networks an alternative device serving a similar purpose could be used as would be apparent to one of ordinary skill in the art.

The environment 1400, which may be a computing resource service provider environment, may be configured to provide various computing resource services to its customers individually or in a combination of services as a distributed computer system. The services provided by the computing resource service provider may include services such as virtual computer system services, block-level data storage services, cryptography services, on-demand data storage services, notification services, authentication services, policy management services, task services and/or other such services. Not all embodiments described herein include all the services described and additional services may be provided in addition to or as an alternative to services explicitly described herein.

In some embodiments, the services provided by a computing resource service provider may include one or more interfaces that enable the customer to submit requests via, for example, appropriately configured API calls to the services. In addition, each of the services may include one or more service interfaces that enable the services to access each other (e.g., to enable a virtual computer system of the virtual computer system service to store data in or retrieve data from the on-demand data storage service and/or to access one or more block-level data storage devices provided by the block level data storage service). Each of the service interfaces may also provide secured and/or protected access to each other via encryption keys and/or other such secured and/or protected access methods, thereby enabling secure and/or protected access between them. Collections of services operating in concert as a distributed computer system may have a single front-end interface and/or multiple interfaces between the elements of the distributed computer system.

As an example, a computing resource service provider may provide access to computer systems using a service such as a virtual computer system service that may be a collection of computer resources configured to instantiate VM instances on behalf of a customer. The customer may interact with the virtual computer system service to provision, place and operate VM instances that are instantiated on physical computer devices hosted and operated by the computing resource service provider. The VM instances may be used for various purposes, such as to operate as servers supporting a website, to operate business applications or, generally, to serve as compute power for the customer. Other applications for the VM instances may be to support database applications, electronic commerce applications, business applications, and/or other applications. In some embodiments, access to computer systems may be provided to a customer by using a system or service that does not employ virtualization or instantiation and instead provisions computer resources on dedicated or shared computers/servers and/or other physical devices.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1402 and the application server 1408, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1410 can include several separate data tables, databases, data documents, dynamic data storage schemes and/or other data storage mechanisms and media for storing data relating to a particular aspect of the present disclosure. For example, the data store illustrated may include mechanisms for storing production data 1412 and user information 1416, which can be used to serve content for the production side. The data store also is shown to include a mechanism for storing log data 1414, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. The application server 1408 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems configured with executable instructions,
receiving an application programming interface request for a secure execution environment; and
fulfilling the application programming interface request by at least:
selecting a target computer system from a plurality of target computer systems, the target computer system selected based at least in part on the target computer system being operable to instantiate the secure execution environment; and
sending a provisioning request to the target computer system to cause the secure execution environment to be instantiated on a processor of the target computer system;
validating the secure execution environment, with at least one application loaded in the secure execution environment, using one or more cryptographic measurements of the secure execution environment calculated by the processor;
validating the at least one application loaded in the secure execution environment using one or more cryptographic measurements of the at least one application made from within the secure execution environment; and
providing, to a device associated with the application programming interface request, a first validation result, the first validation result based at least in part on the one or more cryptographic measurements of the at least one application.

2. The computer-implemented method of claim 1, wherein the target computer system is further selected based at least in part on the target computer system being operable to instantiate the secure execution environment corresponding to a level of security indicator specified within the application programming interface request.

3. The computer-implemented method of claim 1, wherein the target computer system is further selected based at least in part on a proximity to one or more resources associated with a customer.

4. The computer-implemented method of claim 1, further comprising fulfilling another application programming interface request to manage the secure execution environment, the other application programming interface request being a request to create, destroy, measure, populate, resize, add pages to, debug, start, stop, describe, generate keys for, or update the secure execution environment.

5. A system, comprising:
at least one computing device that:
receives an application programming interface request to instantiate a secure execution environment; and
fulfills the application programming interface request by sending, to a target computer system, a provisioning request, the provisioning request specifying a configuration for the secure execution environment, the target computer system selected based at least in part on the target computer system being operable to instantiate the secure execution environment;
provides, into the secure execution environment, one or more executable instructions to cause a cryptographic measurement of the secure execution environment to be provided;
receives, from the secure execution environment, the cryptographic measurement of the secure execution environment calculated by causing at least a portion of the one or more executable instructions to be executed within the secure execution environment while at least one application is loaded in the secure execution environment; and
validates the secure execution environment based at least in part on the cryptographic measurement of the secure execution environment;
validates the at least one application loaded in the secure execution environment using one or more cryptographic measurements of the at least one application made from within the secure execution environment; and
provides, to a device associated with the application programming interface request, a first validation result, the first validation result based at least in part on the one or more cryptographic measurements of the at least one application.

6. The system of claim 5, further comprising a plurality of target computer systems that include the target computer system.

7. The system of claim 5, wherein the system is operated by a service provider and the at least one computing device further launches one or more applications within the secure execution environment, one or more of the one or more applications specified by a customer of the service provider.

8. The system of claim 7, wherein the at least one computing device is further:
validates the one or more applications using one or more cryptographic measurements of the one or more applications, the one or more cryptographic measurements of the one or more applications taken before launching the one or more applications within the secure execution environment; and
provides, to the customer of the service provider, a first validation certificate, the first validation certificate based at least in part on the one or more cryptographic measurements of the one or more applications, the first validation certificate specifying information usable to validate the secure execution environment.

9. The system of claim 5, wherein the system is operated by a service provider and the at least one computing device further, in response to a failure to validate the secure execution environment, sends a message to the service provider, the message at least specifying the failure.

10. The system of claim 5, wherein the at least one computing device further instantiates a virtual machine instance within the secure execution environment.

11. The system of claim 5, wherein the at least one computing device further instantiates a controlling domain within the secure execution environment.

12. The system of claim 5, wherein the measurement is a cryptographic measurement of the secure execution environment made within the secure execution environment, the cryptographic measurement based at least in part on performing one or more hardware instructions, the one or more hardware instructions based at least in part on one or more hardware capabilities associated with the target computer system.

13. A non-transitory computer-readable storage medium having stored thereon executable instructions that, as a result of execution by one or more processors of a computer system, cause the computer system to at least:
  receive an application programming interface request for a secure execution environment; and
  fulfill the application programming interface request by at least:
    selecting a target computer system from a plurality of target computer systems, the target computer system selected based at least in part on the target computer system being operable to instantiate the secure execution environment; and
    sending a provisioning request to the target computer system to cause the secure execution environment to be instantiated on a processor of the target computer system;
  validate the secure execution environment, with at least one application loaded in the secure execution environment, using one or more cryptographic measurements of the secure execution environment calculated by the processor of the target computer system;
  validate the at least one application loaded in the secure execution environment using one or more cryptographic measurements of the at least one application made from within the secure execution environment; and
  provide, to a device associated with the application programming interface request, a first validation result, the first validation result based at least in part on the one or more cryptographic measurements of the at least one application.

14. The non-transitory computer-readable storage medium of claim 13, wherein the instructions further cause the computer system to provide a result of validation of the secure execution environment by a validation certificate.

15. The non-transitory computer-readable storage medium of claim 13, wherein the target computer system is further selected based at least in part on a level of security indicator associated with the target computer system, the level of security indicator associated with the target computer system based at least in part on one or more hardware capabilities of the processor of the target computer system.

16. The non-transitory computer-readable storage medium of claim 13, wherein the processor of the target computer system is a trusted platform module.

17. The non-transitory computer-readable storage medium of claim 13, wherein the at least one application comprises a bootloader that instantiates a key service within the secure execution environment so that the key service provides one or more cryptographic keys to one or more applications operating within an environment provided by a computing resource service provider, the one or more cryptographic keys based at least in part on performing one or more hardware instructions, the one or more hardware instructions based at least in part on one or more hardware capabilities of the processor of the target computer system.

18. The non-transitory computer-readable storage medium of claim 17, wherein the key service executes one or more key service operations associated with one or more secure execution environments, the one or more key service operations causing the computer system to at least:
  produce one or more encrypted data items associated with one or more of the one or more secure execution environments, using one or more of the one or more cryptographic keys; and
  store the one or more encrypted data items in one or more locations specified by the computing resource service provider.

19. The non-transitory computer-readable storage medium of claim 18, wherein the key service further, as a result of detecting a failure of a second secure execution environment, causes the computer system to at least:
  retrieve, from the one or more locations specified by a computing resource service provider, one or more of the one or more encrypted data items, the one or more of the one or more encrypted data items associated with the second secure execution environment; and
  instantiate a third secure execution environment based at least in part on the one or more of the one or more encrypted data items.

20. The non-transitory computer-readable storage medium of claim 13, wherein the target computer system is selected based at least in part on a hardware description of the target computer system stored within a data storage location specified by a computing resource service provider, the hardware description of the target computer system including one or more hardware capabilities of the processor.

* * * * *